(12) United States Patent
Kawaguchi

(10) Patent No.: US 11,906,934 B2
(45) Date of Patent: Feb. 20, 2024

(54) WATCH MOTOR CONTROL CIRCUIT, ELECTRONIC WATCH, AND WATCH MOTOR CONTROL METHOD

(71) Applicant: Seiko Epson Corporation, Toyko (JP)

(72) Inventor: Takashi Kawaguchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 597 days.

(21) Appl. No.: 17/144,213

(22) Filed: Jan. 8, 2021

(65) Prior Publication Data

US 2021/0216045 A1 Jul. 15, 2021

(30) Foreign Application Priority Data

Jan. 9, 2020 (JP) ................................. 2020-001879

(51) Int. Cl.
*G04C 3/14* (2006.01)
*H02P 8/16* (2006.01)
*H02P 8/02* (2006.01)

(52) U.S. Cl.
CPC ................ *G04C 3/146* (2013.01); *H02P 8/02* (2013.01); *H02P 8/16* (2013.01)

(58) Field of Classification Search
CPC ................ H02P 8/02; H02P 8/12; H02P 8/16
See application file for complete search history.

(56) References Cited

U.S. PATENT DOCUMENTS

| 4,772,840 A | 9/1988 | Taghezout |
| 5,963,005 A | 10/1999 | Yamaji |
| 6,072,752 A * | 6/2000 | Igarashi ................ G04C 3/146 |
| | | 368/80 |
| 2010/0001673 A1 | 1/2010 | Cardoletti et al. |
| 2019/0305702 A1 | 10/2019 | Kawaguchi |

FOREIGN PATENT DOCUMENTS

| JP | S63-23596 A | 1/1988 |
| JP | H11-225499 A | 8/1999 |
| JP | 2009-542186 A | 11/2009 |
| JP | 2019-176706 A | 10/2019 |

\* cited by examiner

*Primary Examiner* — Renee S Luebke
*Assistant Examiner* — Matthew Hwang
(74) *Attorney, Agent, or Firm* — Harness, Dickey & Pierce, P.L.C.

(57) ABSTRACT

An electronic watch includes a driver controlled to be in an ON state in which a drive current is supplied to a coil of a watch motor, and an OFF state in which the drive current is not supplied, a current detector that detects a current value flowing through the coil, a driver controller that controls the driver, a polarity switching controller that alternately switches a polarity of the drive current to a first polarity and a second polarity, a sampling controller that, at a sampling cycle, intermittently causes the current detector and the driver controller to operate, and a sampling cycle setting controller that detects a sampling cycle setting condition and changes the sampling cycle in at least two stages of a first cycle and a second cycle longer than the first cycle.

10 Claims, 14 Drawing Sheets

|    | NOT BEING DRIVEN | ON PERIOD | | OFF PERIOD | |
|----|------------------|-----------|---|------------|---|
| PL | —  | L | H | L | H |
| P1 | H  | L | H | H | H |
| P2 | H  | H | L | H | H |
| N1 | H  | L | L | H | L |
| N2 | H  | L | L | L | H |
| N3 | H  | L | H | H | H |
| N4 | H  | H | L | H | H |

FIG. 6

WATCH MOTOR CONTROL CIRCUIT, ELECTRONIC WATCH, AND WATCH MOTOR CONTROL METHOD

The present application is based on, and claims priority from JP Application Serial Number 2020-001879, filed Jan. 9, 2020, the disclosure of which is hereby incorporated by reference herein in its entirety.

BACKGROUND

1. Technical Field

The present disclosure relates to a watch motor control circuit, an electronic watch, and a watch motor control method.

2. Related Art

In JP-T-2009-542186, technology is disclosed that controls continuous rotation of a motor by switching off a supply of a current to a coil of the motor when the current flowing through the coil exceeds an upper limit threshold value and switching on the supply when the current falls below a lower limit threshold value, and estimating a position of a rotor of the motor on the basis of an ON time period during which the supply of the current is continued, or an OFF time period during which the stopping of the current is continued.

In the above-described control technology, it is necessary to constantly perform sampling processing for detecting a current value while the motor is being driven. Therefore, when the motor is driven at high speed, the sampling processing also needs to be performed at high speed, and there is a problem in that power consumption of a motor control circuit increases.

SUMMARY

A watch motor control device according to an aspect of the present disclosure includes a driver configured to be controlled to be in an ON state in which a drive current is supplied to a coil of a watch motor, and an OFF state in which the drive current is not supplied, a current detector including a lower limit detector configured to detect that the drive current flowing through the coil is less than a lower limit current value, and an upper limit detector configured to detect that the drive current flowing through the coil is greater than an upper limit current value, a driver controller that, after controlling the driver in the ON state, is configured to control the driver to be in the OFF state when the upper limit detector detects that the drive current is greater than the upper limit current value, and, after controlling the driver in the OFF state, is configured to control the driver to be in the ON state when the lower limit detector detects that the driver current is less than the lower limit current value, a polarity switching controller configured to alternately switch a polarity of the drive current to a first polarity and a second polarity when one of an ON time period that is duration of the ON state of the driver, and an OFF time period that is duration of the OFF state of the driver meets a polarity switching condition, a sampling controller configured to, at a sampling cycle, intermittently cause the current detector and the driver controller to operate, and a sampling cycle setting controller configured to detect a sampling cycle setting condition and change the sampling cycle in at least two stages of a first cycle and a second cycle longer than the first cycle, in accordance with the detected sampling cycle setting condition.

A movement according to an aspect of the present disclosure includes the watch motor control circuit, and a watch motor controlled by the watch motor control circuit.

An electronic watch according to an aspect of the present disclosure includes the watch motor control circuit, and a watch motor controlled by the watch motor control circuit.

A watch motor control method according to an aspect of the present disclosure is a watch motor control method that switches to an ON state and an OFF state in accordance with a current value of a drive current supplied to a coil of a watch motor, and when it is detected that one of an ON time period, which is duration of the ON state, and an OFF time period, which is duration of the OFF state, meets a polarity switching condition, performs constant current control to switch a polarity of the drive current and perform step driving of a rotor. The method includes executing the constant current control at a sampling cycle, and detecting a sampling cycle setting condition, and changing the sampling cycle in at least two stages of a first cycle and a second cycle longer than the first cycle, in accordance with the detected sampling cycle setting condition.

BRIEF DESCRIPTION OF THE DRAWINGS

FIG. 6 is a diagram illustrating a drive signal output to the driver according to the first embodiment.

DESCRIPTION OF EXEMPLARY EMBODIMENTS

First Embodiment

An electronic watch 1 according to a first embodiment of the present disclosure will be described below with reference to the drawings.

Figure 1:
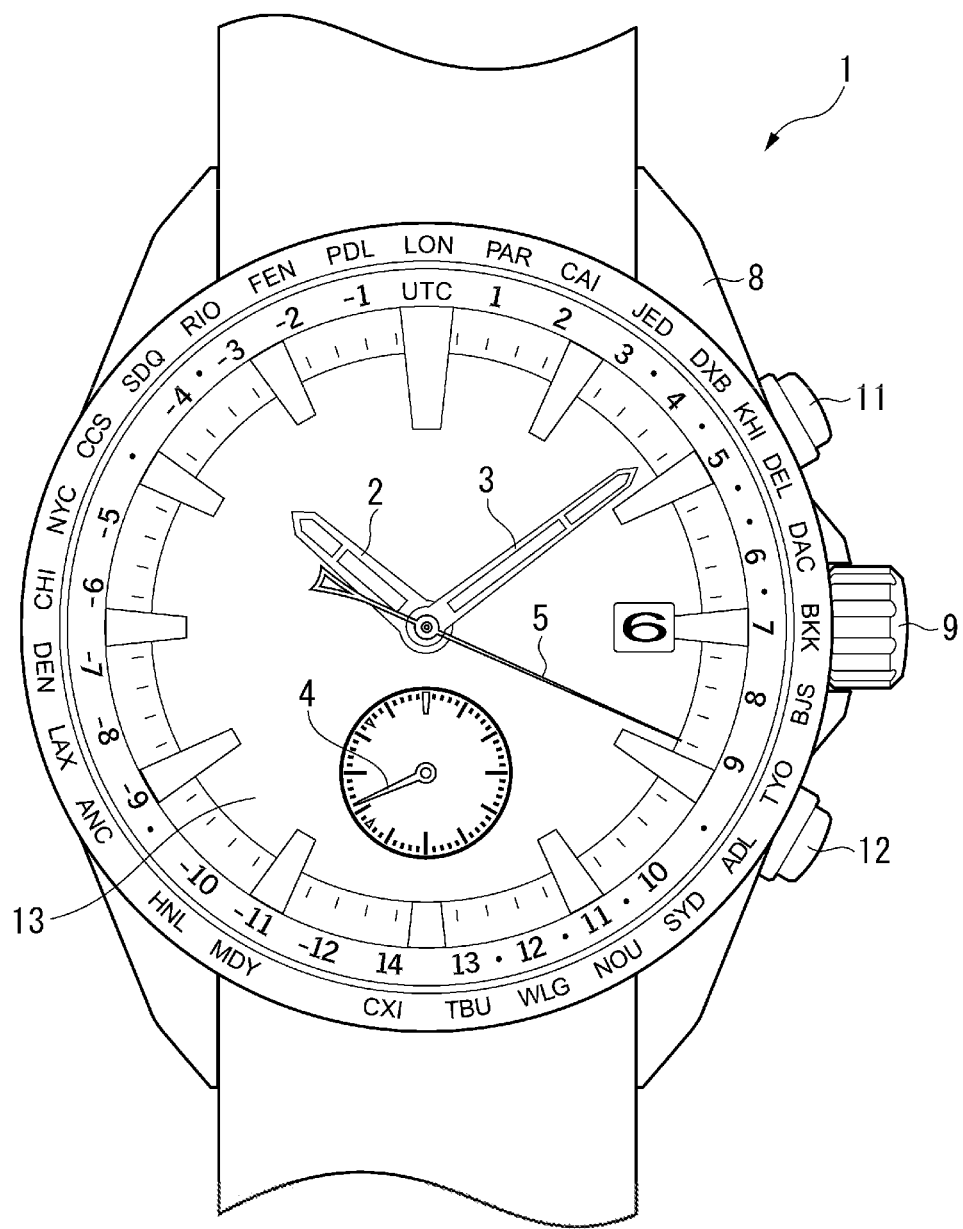
FIG. 1 is a front view illustrating an electronic watch according to a first embodiment.

As illustrated in FIG. 1, the electronic watch 1 is an analog electronic watch including a world time function. The electronic watch 1 is provided with an hour hand 2 and a minute hand 3 that are center hands, a small seconds hand 4 disposed on the 6 o'clock side, a city hand 5 that is provided coaxially with the hour hand 2 and the minute hand 3 and that indicates a time zone, a crown 9, buttons 11 and 12, and a case 8 accommodating a movement.

The hour hand 2, the minute hand 3, and the city hand 5 are respectively attached to three pointer shafts that are provided in a center portion of a dial 13 of the electronic watch 1 in plan view and that are orthogonal to the surface of the dial 13.

The small seconds hand 4 is attached to a guide shaft that is independent of the other guide shafts, further to the 6 o'clock side than the center portion of the dial 13 in plan view.

Abbreviations representing representative cities of time zones are denoted on a bezel, and numbers indicating a time difference with coordinated universal time (UTC) are denoted on a dial ring, and the city hand 5 indicates these during a selection operation to select the time zone.

Circuit Configuration of Electronic Watch

Figure 2:
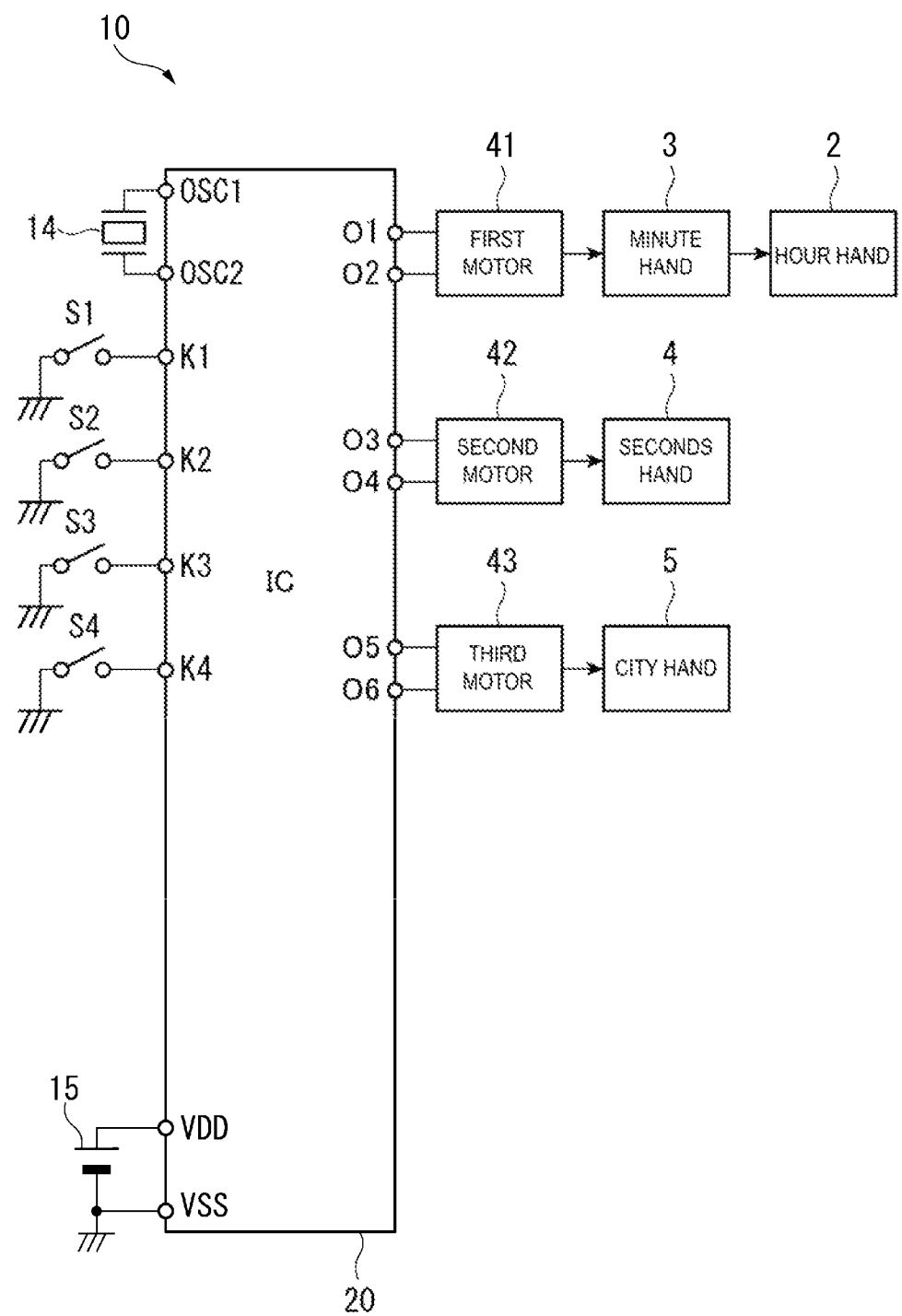
FIG. 2 is a circuit diagram illustrating a circuit configuration of the electronic watch according to the first embodiment.

As illustrated in FIG. 2, a movement 10 of the electronic watch 1 is provided with a crystal oscillator 14 that is a signal source, a battery 15 that is a power source, push switches S1 and S2 that are turned on and off in conjunction with an operation of the buttons 11 and 12, slide switches S3 and S4 that are turned on and off in conjunction with the crown 9 being pulled out, a first motor 41, a second motor 42, a third motor 43, and a watch IC 20.

Configuration of Watch Motor

Figure 3:
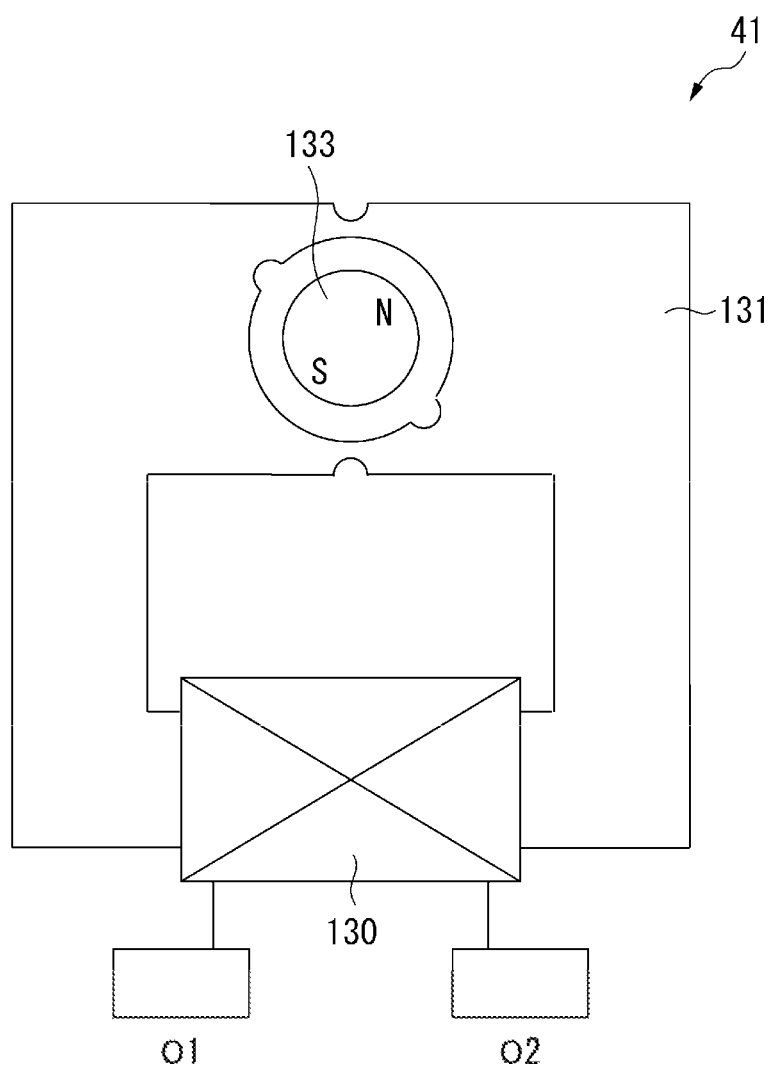
FIG. 3 is a diagram illustrating a configuration of a motor of the electronic watch according to the first embodiment.

As illustrated in FIG. 3, the first motor 41 is provided with a stator 131, a coil 130, and a rotor 133. Both ends of the coil 130 are coupled to output terminals O1 and O2 of a driver 51 to be described below, and the rotor 133 is a magnet that is magnetized to two poles in a radial direction. Thus, the first motor 41 is a bipolar single-phase stepper motor used for an electronic watch, which is driven by a drive signal input to the driver 51, as described below.

The second motor 42 and the third motor 43 are bipolar single-phase stepper motors similar to the first motor 41, and descriptions thereof will thus be omitted.

As illustrated in FIG. 2, the minute hand 3 and the hour hand 2 are moved in conjunction with each other by the first motor 41. Thus, the minute hand 3 displays the time in minutes, that is, in divisions of one circumference divided by 360, and the hour hand 2 displays the time in hours, that is, in divisions of one circumference divided by 4320. The hour hand 2 and the minute hand 3 are moved by a division of one minute when the rotor 133 is rotated by a half circumference.

The small seconds hand 4 is moved by the second motor 42 to indicate the time in seconds. The city hand 5 is moved by the third motor 43 to indicate the representative city of the set time zone.

As illustrated in FIG. 2, the IC 20 is provided with coupling terminals OSC1 and OSC2 to which the crystal oscillator 14 is coupled, input terminals K1, K2, K3, and K4 to which the switches S1, S2, S3, and S4 are coupled, power supply terminals VDD and VSS to which the battery 15 is coupled, and output terminals O1 to O6 coupled to the respective coils 130 of the first motor 41 to the third motor 43.

Note that in the present embodiment, a positive electrode of the battery 15 is coupled to the power supply terminal VDD on the high potential side, a negative electrode thereof is coupled to the power supply terminal VSS on the low potential side, and the power supply terminal VSS on the low potential side is set to ground (a reference potential).

The crystal oscillator 14 is driven by an oscillating circuit 21, which will be described later, and generates an oscillation signal.

The battery 15 is configured by a primary battery or a secondary battery. When the battery 15 is the secondary battery, the battery 15 is charged by a solar cell (not illustrated), or the like.

The switch S1 is a push switch that receives an input in conjunction with the button 11 that is positioned substantially at the 2 o'clock position of the electronic watch 1, and is in an ON state when the button 11 is pushed in, and is in an OFF state when the button 11 is not pushed in.

The switch S2 is a push switch that receives an input in conjunction with the button 12 that is positioned substantially at the 4 o'clock position of the electronic watch 1, and is in an ON state when the button 12 is pushed in, and is in an OFF state when the button 12 is not pushed in.

The switches S3 and S4 are slide switches that operate in conjunction with the pulling out of the crown 9. In the present embodiment, the switch S3 is in an ON state and the switch S4 is in an OFF state in a state in which the crown 9 is pulled out to a first stage, the switch S4 is in an ON state and the switch S3 is in an OFF state in a state in which the crown 9 is pulled out to a second stage, and the switches S3 and S4 are both in the OFF state when the crown 9 is at a zero stage.

Circuit Configuration of IC

Figure 4:
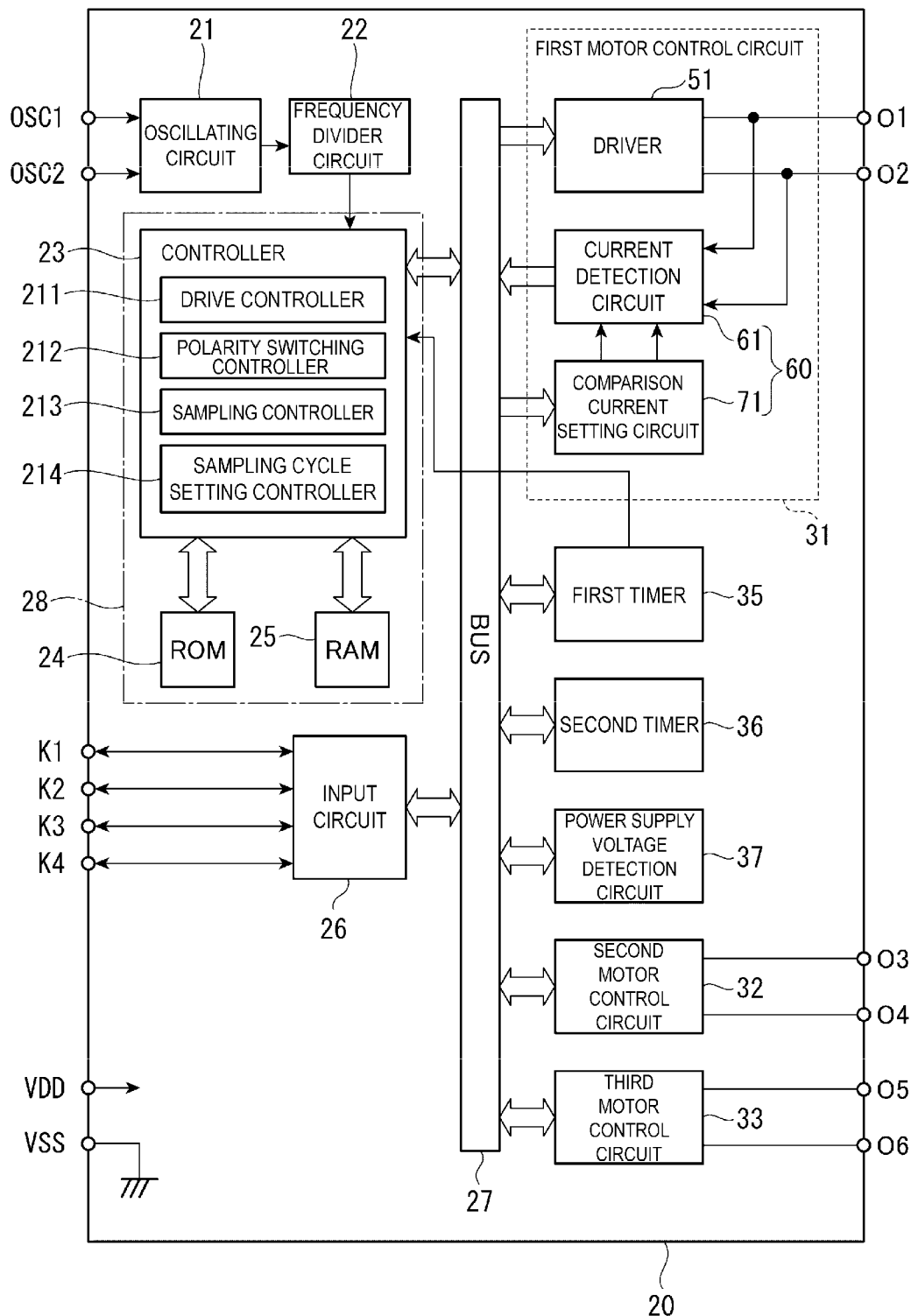
FIG. 4 is a block diagram illustrating a configuration of an IC of the electronic watch according to the first embodiment.

As illustrated in FIG. 4, the IC 20 is provided with the oscillating circuit 21, a frequency divider circuit 22, a controller 23, a ROM 24, a RAM 25, an input circuit 26, and a bus 27. Note that ROM is an abbreviation for read only memory, and RAM is an abbreviation for random access memory.

The IC 20 is provided with a first motor control circuit 31 that drives the first motor 41, a second motor control circuit 32 that drives the second motor 42, a third motor control circuit 33 that drives the third motor 43, a first timer 35, a second timer 36, and a power supply voltage detection circuit 37. Note that each of the functions of the IC 20 may be configured by a single chip or may be configured by combining a plurality of ICs.

The oscillating circuit 21 causes the crystal oscillator 14, which is the reference signal source, to oscillate at a high frequency, and outputs an oscillation signal, to the frequency divider circuit 22, at a predetermined frequency (32768 Hz) generated by the high frequency oscillation.

The frequency divider circuit 22 supplies a timing signal (a clock signal) to the controller 23 by dividing the output of the oscillating circuit 21.

The ROM 24 stores various programs to be executed by the controller 23. In the present embodiment, the ROM 24 stores programs for realizing basic watch functions, driving processing for each of the motors 41 to 43, and the like.

The RAM 25 is used as a working memory or the like when the controller 23 executes a program.

The controller 23 realizes each of functions using the programs stored in the ROM 24, and the RAM 25. Thus, a control circuit 28 is configured by the controller 23, the ROM 24, and the RAM 25. The controller 23 functions as a drive controller 211, a polarity switching controller 212, a sampling controller 213, and a sampling cycle setting controller 214. In other words, the drive controller 211, the polarity switching controller 212, the sampling controller 213, and the sampling cycle setting controller 214 are functions realized as a result of the controller 23, which is a CPU, executing the programs stored in the ROM 24.

As will be described below, the controller 23 performs control by outputting a control signal to the first motor control circuit 31, the second motor control circuit 32, and the third motor control circuit 33.

The drive controller 211 functions as a driver controller that outputs the control signal to the first motor control circuit 31 and controls the driving of the driver 51 of the first motor control circuit 31. Furthermore, the drive controller 211 also outputs the control signal to the second motor control circuit 32, and the third motor control circuit 33, and controls the second motor control circuit 32, and the third motor control circuit 33.

The polarity switching controller 212 performs control that alternately switches the polarity of the drive current flowing in the coil 130 of the first motor 41 between a first polarity and a second polarity.

The sampling controller 213 performs control that causes the current detector 60, which will be described later, and the drive controller 211, which is the driver controller, to be intermittently operated at a sampling cycle.

The sampling cycle setting controller 214 detects the sampling cycle setting condition and performs control that changes the sampling cycle in at least two stages of a first cycle tsp tsp1 and a second cycle tsp2 that is longer than the first cycle tsp1, in accordance with the detected sampling cycle setting condition.

Thus, a watch motor control circuit of the present disclosure is configured to include the control circuit 28 and the first motor control circuit 31 of the IC 20. Further, the first motor 41 is a watch motor controlled by the watch motor control circuit of the present disclosure.

The input circuit 26 outputs a state of the input terminals K1, K2, K3, and K4 to the bus 27. The bus 27 is used to transfer data and the like between the controller 23, the input circuit 26, the first motor control circuit 31, the second motor control circuit 32, and the third motor control circuit 33.

The first motor control circuit 31, the second motor control circuit 32, and the third motor control circuit 33 control the driving of the first motor 41, the second motor 42, and the third motor 43, using commands input from the controller 23 via the bus 27. As will be described below, the controller 23 performs constant current control, with respect to the first motor control circuit 31, that controls the drive current of the first motor 41 to be maintained in a substantially constant current range.

The first timer 35 is a timer that measures the sampling cycle. In other words, when the sampling cycle set by the sampling cycle setting controller 214 is 2 μsec, for example, the first timer 35 measures an elapsed time period after the start of the control of the driver 51 by the drive controller 211, and outputs a time signal to the sampling controller 213 of the controller 23 every time the sampling cycle, that is, 2 μsec, has elapsed. Thus, the sampling controller 213 operates the drive controller 211 and the like for each sampling cycle measured by the first timer 35.

As will be described below, the second timer 36 measures an OFF time period, which is a condition for polarity switching.

The power supply voltage detection circuit 37 is a voltage detection circuit that detects the voltage of the battery 15, that is, the drive voltage of the driver 51.

Configuration of Motor Control Circuit

Details of the first motor control circuit 31 will be described below.

Since the second motor control circuit 32 drives the first motor 41 for the small seconds hand 4 every 1 second, the second motor control circuit 32 is a motor control circuit capable of low power consumption and is employed in a wristwatch or the like. In other words, after outputting a main drive pulse having a small pulse width, the second motor control circuit 32 measures an induced voltage of the coil 130 of the second motor 42 and thus detects whether or not the rotor 133 has rotated. When the rotor 133 has not rotated, the second motor control circuit 32 outputs a correction drive pulse fixed at a large pulse width compared to the main drive pulse, and thus performs control to reliably rotate the rotor 133. Note that the second motor control circuit 32 may drive the second motor 42 with a fixed pulse.

The third motor control circuit 33 controls the third motor 43 such that the city hand 5 can move in both forward and reverse directions, namely, in both the clockwise direction and the counterclockwise direction. It is thus sufficient that the third motor control circuit 33 be capable of driving and controlling the third motor 43 in both the forward and reverse directions.

First Motor Control Circuit

The first motor control circuit 31 is a control circuit capable of moving the hour hand 2 and the minute hand 3 at high speed during a time difference correction using the city hand 5.

Figure 5:
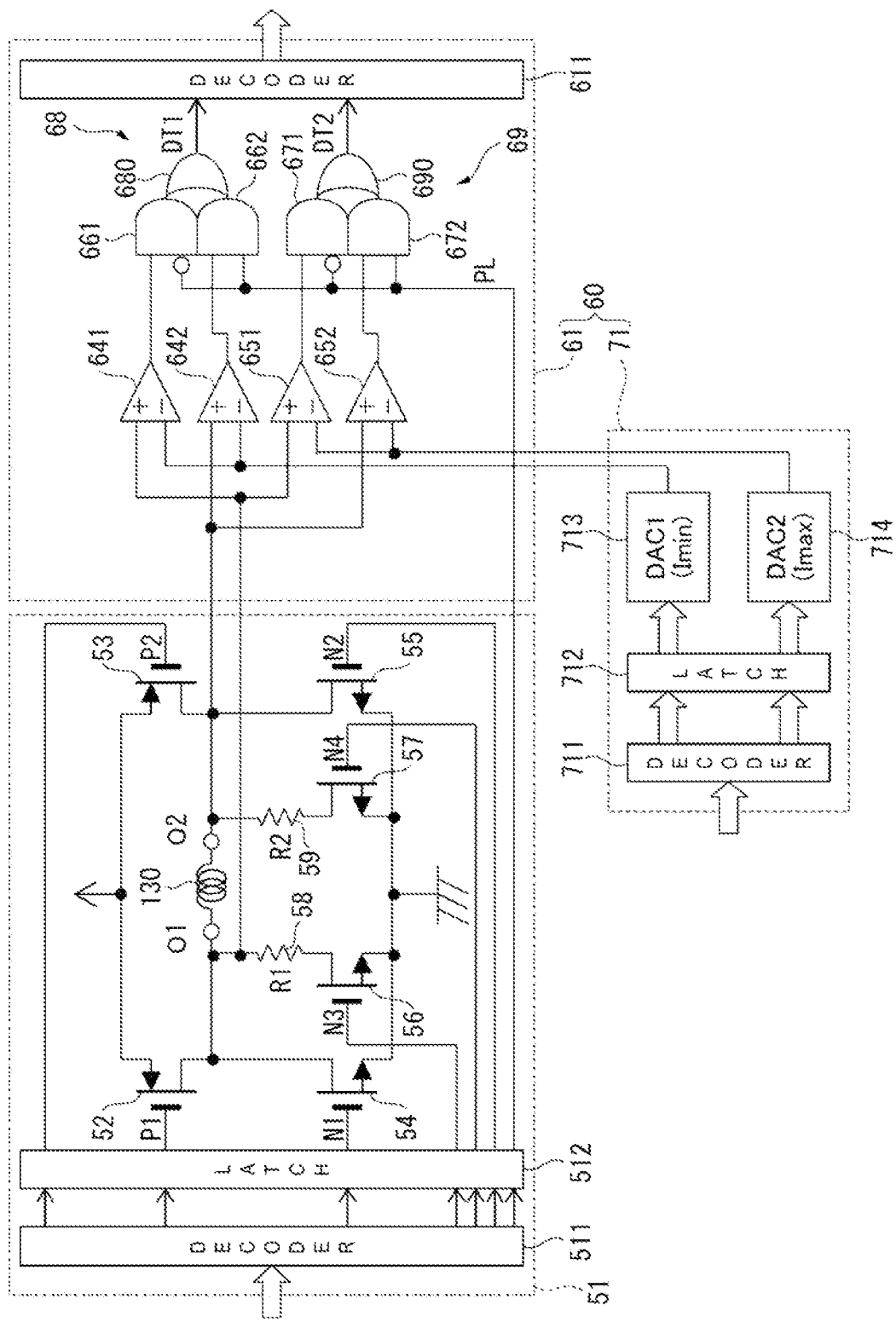
FIG. 5 is a circuit diagram illustrating a configuration of a driver, a current detection circuit, and a comparison current setting circuit according to the first embodiment.

As illustrated in FIG. 4 and FIG. 5, the first motor control circuit 31 is provided with the driver 51, which is the driving device that outputs the drive signal to the coil 130 of the first motor 41, the current detection circuit 61 that determines whether or not the current value flowing in the coil 130 exceeds a threshold value, namely, a comparison current, and a comparison current setting circuit 71 that sets the comparison current of the current detection circuit 61.

Driver

As illustrated in FIG. 5, the driver 51 is provided with two Pch transistors 52 and 53, four Nch transistors 54, 55, 56, and 57, two detection resistors 58 and 59, a decoder 511, and a latch 512.

A control signal of the driver 51 output from the controller 23 is input to the decoder 511 via the bus 27, and the decoder 511 decodes the input control signal and outputs the drive signal. Since this drive signal is held by the latch 512, the same drive signal output is maintained until the drive signal output from the decoder 511 is switched.

FIG. 6 is an example of the drive signal output from the decoder 511. The drive signal is output as a drive polarity signal PL, and gate signals P1, P2, N1, N2, N3, and N4. When the driver 51 is not being driven, the drive polarity signal PL is not output, and the gate signals P1, P2, N1, N2, N3, and N4 are all H level signals. Thus, the output terminals O1 and O2 of the coil 130 are short-circuited, a short brake is applied to the first motor 41 and the first motor 41 is thus controlled to be in a stopped state.

When the polarity of the drive current of the first motor 41 is controlled to be the first polarity, the drive polarity signal PL is at the L level. In the first polarity in which the drive polarity signal PL is set to the L level, when the driver 51 is controlled to be in the ON state, that is, in an "ON period" illustrated in FIG. 6, P1 is at the L level, P2 is at the H level, the Pch transistor 52 is ON, and the Pch transistor 53 is OFF. Further, N1 to N3 are at the L level, N4 is at the H level, the Nch transistors 54, 55, and 56 are OFF, and the Nch transistor 57 is ON. Thus, the current flows through the Pch transistor 52, the terminal O1, the coil 130, the terminal O2, the detection resistor 59, and the Nch transistor 57. In the present embodiment, the current flowing through the coil 130 from the terminal O1 toward the terminal O2 is a current in the forward direction.

In the present embodiment, the drive current supplied to the coil 130 is switched between the first polarity and the second polarity, and, in the case of the first polarity, the current flows through the coil 130 in the forward direction. Thus, the state in which the current in the forward direction flows through the coil 130 is a state in which the driver 51 is controlled to be in the ON state by the drive signal of the first polarity.

Next, in the first polarity in which the drive polarity signal PL is at the L level, when the driver 51 is controlled to be in the OFF state, that is, in an "OFF period" illustrated in FIG. 6, P1 is at the H level, P2 is at the H level, N1 is at the H level, N2 is at the L level, N3 is at the H level, and N4 is at the H level. Thus, the Pch transistors 52 and 53, and the Nch transistor 55 are in the OFF state, and the Nch transistors 54, 56, and 57 are controlled to be in the ON state. The terminal O1 of the coil 130 is coupled to the power supply terminal VSS and is short-circuited, the terminal O2 is coupled to the power supply terminal VSS via the detection resistor 59, and the supply of a drive current I from the driver 51 to the coil 130 also stops. Thus, a state in which no current is supplied to the coil 130 is a state in which the driver 51 is controlled to be in the OFF state. In the present embodiment, a state in which the Pch transistors 52 and 53 and the Nch transistor 55 are OFF, and the Nch transistors 54, 56, and 57 are ON is an OFF state of the driver 51 in the first polarity.

When the polarity of the drive current of the first motor 41 is controlled to be the second polarity, the drive polarity signal PL is at the H level. In the second polarity in which the drive signal PL is at the H level, when the driver 51 is controlled to be in the ON state, that is, in the "ON period" illustrated in FIG. 6, P1 is at the H level, P2 is at the L level, N1 is at the L level, N2 is at the L level, N3 is at the H level, and N4 is at the L level. Thus, the current flows through the Pch transistor 53, the terminal O2, the coil 130, the terminal O1, the detection resistor 58, and the Nch transistor 56. In the present embodiment, the current flowing from the terminal O2 toward the terminal O1 is a current in the reverse direction.

In other words, in the case of the second polarity, the current in the reverse direction flows through the coil 130. Thus, the state in which the current in the reverse direction flows through the coil 130 is a state in which the driver 51 is controlled to be in the ON state by the drive signal of the second polarity.

Next, in the second polarity in which the drive polarity signal PL is at the H level, when the driver 51 is controlled to be in the OFF state, that is, in the "OFF period" illustrated in FIG. 6, P1 is at the H level, P2 is at the H level, N1 is at the L level, N2 is at the H level, N3 is at the H level, and N4 is at the H level. Thus, the Pch transistors 52 and 53 and the Nch transistor 54 are controlled to be in the OFF state, and the Nch transistors 55, 56, and 57 are controlled to be in the ON state. The terminal O1 of the coil 130 is coupled to the power supply terminal VSS through the detection resistor 58, the terminal O2 is coupled to the power supply terminal VSS and is short-circuited, and the supply of the drive current I from the driver 51 to the coil 130 also stops. Thus, the state in which no current is supplied to the coil 130 is the state in which the driver 51 is controlled to be in the OFF state. In the present embodiment, the state in which the Pch transistors 52 and 53 and the Nch transistor 54 are OFF, and the Nch transistors 55, 56, and 57 are ON is an OFF state of the driver 51 in the second polarity.

The current detection circuit 61 is provided with comparators 641, 642, 651, and 652 and complex gates 68 and 69. The complex gate 68 is one element provided with the same function as that of a combination of AND circuits 661 and 662 and an OR circuit 680 illustrated in FIG. 5. The complex gate 69 is one element provided with the same function as that of a combination of AND circuits 671 and 672 and an OR circuit 690.

The comparators 641 and 642 compare the voltage generated at both ends of the detection resistors 58 and 59 having resistance values R1 and R2 with a comparison voltage corresponding to a lower limit current value Imin output from the comparison current setting circuit 71.

Since the drive polarity signal PL is inverted and input to the AND circuit 661, and the drive polarity signal PL is input as it is to the AND circuit 662, the output of one of the comparators 641 and 642 selected by the drive polarity signal PL is output as a detection signal DT1.

The comparators 651 and 652 compare the voltage generated at both ends of the detection resistors 58 and 59 having the resistance values R1 and R2 with a comparison voltage corresponding to an upper limit current value Imax output from the comparison current setting circuit 71.

Since the drive polarity signal PL is inverted and input to the AND circuit 671, and the drive polarity signal PL is input as it is to the AND circuit 672, the output of one of the comparators 651 and 652 selected by the drive polarity signal PL is output as a detection signal DT2.

The comparison current setting circuit 71 is provided with a decoder 711 that decodes a setting signal input from the controller 23 via the bus 27, a latch 712 that holds an output of the decoder 711, and DA converters 713 and 714 that output a voltage in accordance with the input setting signal. The DA converter 713 is a first DA converter (DAC 1) that generates a comparison voltage corresponding to the lower limit current value Imin. The DA converter 714 is a second DA converter (DAC 2) that generates a comparison voltage corresponding to the upper limit current value Imax. Thus, the controller 23 can easily change the set values of the lower limit current value Imin and the upper limit current value Imax by changing the setting signal output to the comparison current setting circuit 71.

When the drive current I flowing through the coil 130 is equal to or greater than the lower limit current value Imin, the voltage generated at both ends of the detection resistors 58 and 59 exceeds the output voltage of the DA converter 713, and thus, the detection signal DT1 is at the H level. On the other hand, when the drive current I is less than the lower limit current value Imin, the detection signal DT1 is at the L level. Thus, the DA converter 713, the comparators 641 and 642, and the complex gate 68 are lower limit detectors that detect that the drive current I flowing through the coil 130 is less than the lower limit current value Imin.

The DA converter 714 generates a voltage corresponding to the upper limit current value Imax. Thus, the detection signal DT2 of the current detection circuit 61 is at the H level when the drive current I flowing through the coil 130 exceeds the upper limit current value Imax, and is at the L level when the drive current I flowing through the coil 130 is equal to or less than the upper limit current value Imax. Thus, the DA converter 714, the comparators 651 and 652, and the complex gate 69 are upper limit detectors that detect that the drive current I flowing through the coil 130 has exceeded the upper limit current value Imax.

The detection signals DT1 and DT2 output from the complex gates 68 and 69 are decoded by the decoder 611 and output to the controller 23 via the bus 27. Using the detection signals DT1 and DT2, the controller 23 outputs the control signal for controlling the driver 51.

Thus, the current detector 60 is configured by the current detection circuit 61, which includes the lower limit detectors and the upper limit detectors, and the comparison current setting circuit 71.

Time Zone Change Processing

In the present embodiment, a specification is used in which, the city hand 5 moves to a display position of a next city having a time difference of 1 hour each time the switch S1 receives an input as a result of the button 11 being pressed, and, in conjunction with the movement of the city hand 5, the hour hand 2 and the minute hand 3 are moved by being fast-forwarded by plus 60 minutes.

Thus, when the switch S1 receives the input as a result of the button 11 being pressed, the control circuit 28 causes the city hand 5 to rotate forward, that is, rotate rightward, to a position indicating a plus one hour time difference, using the drive pulse output from the third motor control circuit 33. Note that indication positions of the cities representing each of the time zones are stored in advance in the RAM 25 or the like, and the control circuit 28 can control the city hand 5 such that the city hand 5 moves to the indication position of the next city, which has the one hour time difference. A description of the method for moving the city hand 5 will be omitted since a control method of known art can be used.

When the city hand 5 is rotated forward to the plus one hour time difference position, the drive controller 211 of the control circuit 28 controls the first motor control circuit 31 to perform control that fast-forwards the hour hand 2 and the minute hand 3 by one hour.

Hand movement control of the hour hand 2 and the minute hand 3 by the first motor control circuit 31 will be described below on the basis of a flowchart illustrated in FIG. 7 and a timing chart illustrated in FIG. 8. Note that in the present embodiment, the minute hand 3 is set to perform one full rotation when the first motor 41 is driven 360 steps, and the hour hand 2 is set to perform one full rotation when the first motor 41 is driven 4320 steps.

Further, in the flowchart and the following description, turning the driver 51 ON refers to controlling the driver 51 to be in the ON state in which the drive current can be caused to flow through the coil 130, and turning the driver 51 OFF refers to controlling the driver 51 to be in the OFF state in which the drive current cannot be caused to flow through the coil 130. Further, as a result of the driver 51 being turned ON, the first motor 41 operates and the hour hand 2 and the minute hand 3 are driven.

Figure 8:
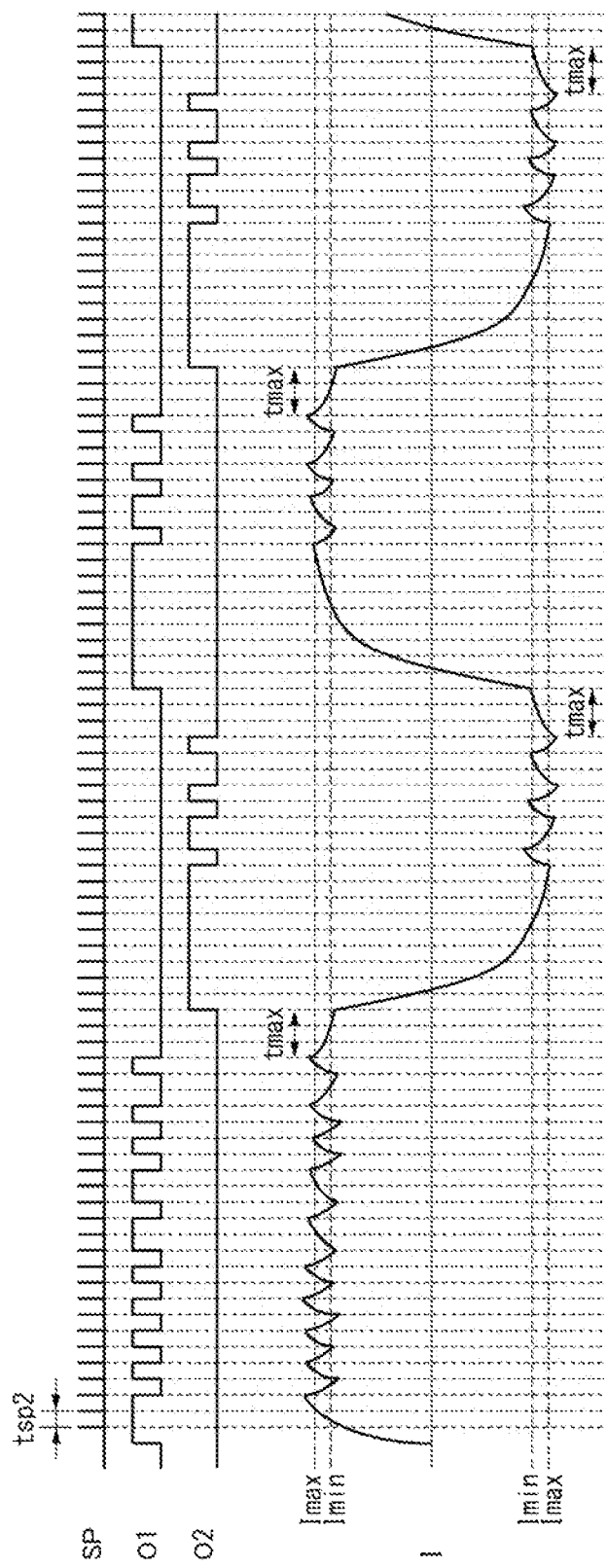
FIG. 8 is a timing chart illustrating operations of the motor control processing according to the first embodiment.

In the timing chart illustrated in FIG. 8, SP indicates a signal output from the first timer 35 to the controller 23 for each of sampling cycles tsp. Further, O1 indicates the voltage level of the output terminal O1, and O2 indicates the voltage level of the output terminal O2. Thus, when the terminal O1 is at the H level and the terminal O2 is at the L level, this indicates the ON state in the first polarity in which the drive current flows through the coil 130 from the terminal O1 toward the terminal O2. Further, when the terminal O2 is at the H level and the terminal O1 is at the L level, this indicates the ON state in the second polarity in which the drive current flows through the coil 130 from the terminal O2 toward the O1. Furthermore, when the terminals O1 and O2 are both at the L level, this indicates the OFF state in which the drive current does not flow through the coil 130.

When the city hand 5 is rotated forward to the position indicating the plus one hour time difference, in order to advance the hour hand 2 and the minute hand 3 by one hour, the drive controller 211 sets a step number of the first motor 41 to 360 and starts driving the first motor 41.

First, the drive controller 211 executes step S1 of detecting the power supply voltage, that is, the drive voltage of the driver 51, using the power supply voltage detection circuit 37. The power supply voltage detected by the power supply voltage detection circuit 37 is an example of the sampling cycle setting condition.

Next, the sampling cycle setting controller 214 executes step S2 of determining whether or not the power supply voltage, which is the sampling cycle setting condition, is equal to or greater than a voltage threshold value V1. The voltage threshold value V1 is set as appropriate in accordance with the type of the battery 15 of the electronic watch 1 and the like, and is 2.5 V, for example.

When the drive voltage is higher than the voltage threshold value V1, a drive current startup is also fast, so when the sampling cycle of the current detection is long, detection errors increase due to a delay in the detection timing. On the other hand, when the sampling cycle of the current detection is short, the current consumption increases.

Thus, when the power supply voltage is equal to or greater than the voltage threshold value V1, in other words, when YES is determined at step S2, the sampling cycle setting controller 214 executes step S3 in which the sampling cycle tsp is set to the first cycle tsp1. When the power supply voltage is less than the voltage threshold V1, in other words, when NO is determined at step S2, the sampling cycle setting controller 214 executes step S4 in which the sampling cycle tsp is set to the second cycle tsp2 that is longer than the first cycle tsp1. The first cycle tsp1 and the second cycle tsp2 are set as appropriate in accordance with the performance of the controller 23 and the like, and the first cycle tsp1 is 2 μsec, and the second cycle tsp2 is 4 μsec, for example. Note that the timing chart illustrated in FIG. 8 is an example in which the second cycle tsp2 is set as the sampling cycle tsp.

Next, the drive controller 211 executes step S5 of causing the driver 51 of the first motor control circuit 31 to be in the ON state, and starting the driving of the first motor 41.

Using the first timer 35, the sampling controller 213 measures an elapsed time period after the execution of step S5, and executes step S6 of determining whether or not the elapsed time period has passed the sampling cycle tsp. When the elapsed time period has not passed the sampling cycle tsp, the sampling controller 213 determines NO at step S6 and repeats the determination processing at step S6.

When the elapsed time period has passed the sampling cycle tsp, the sampling controller 213 determines YES at step S6. Then, the sampling controller 213 executes step S7, which is current detection processing that operates the current detector 60 and determines whether or not the drive current I exceeds the upper limit current value Imax.

When NO is determined at step S7, the sampling controller 213 returns to step S6 and continues the processing, and executes step S7 once the next sampling cycle tsp has elapsed. In other words, until the sampling controller 213 determines YES at step S7, the current detector 60 is operated at each sampling cycle tsp to perform the current detection processing at step S7. In FIG. 8, the drive current I is less than the upper limit current value Imax from the start of the ON state of the driver 51, in which the terminal O1 is at the H level, to a second cycle, and exceeds the upper limit current value Imax in a third cycle. Thus, YES is determined at step S7, when the third cycle of the sampling cycle tsp elapses.

Further, until YES is determined at step S7, the drive signal obtained by decoding the control signal output from the drive controller 211 using the decoder 511 is maintained in the latch 512, and thus the drive controller 211 maintains the ON state of the driver 51. Thus, until YES is determined at step S7, the sampling controller 213 executes driving processing of the ON state by the drive controller 211 for each of the sampling cycles tsp.

The current detector 60 outputs, to the drive controller 211 of the controller 23 via the decoder 611 and the bus 27, that YES has been determined at step S7. Then, the drive controller 211 executes step S8 of causing the driver 51 of the first motor control circuit 31 to be in the OFF state.

Using the first timer 35, the sampling controller 213 measures an elapsed time period after the execution of step S8, and executes step S9 of determining whether or not the elapsed time period has passed the sampling cycle tsp. When the elapsed time period has not passed the sampling cycle tsp, the sampling controller 213 determines NO at step S9 and repeats the determination processing at step S9.

When the elapsed time period has passed the sampling cycle tsp, the sampling controller 213 determines YES at step S9 and executes step S10, which is current detection processing that operates the current detector 60, and determines whether or not the drive current I has fallen below the lower limit current value Imin.

When the current detector 60 determines NO at step S10, the sampling controller 213 returns to step S9 and continues the processing. Thus, once the next sampling cycle tsp elapses, the sampling controller 213 executes step S10 again. In other words, until YES is determined at step S10, the sampling controller 213 operates the current detector 60 and executes the current detection processing at step S10 for every sampling cycle tsp.

Further, until YES is determined at step S10, the drive signal that causes the driver 51 to be in the OFF state is maintained in the latch 512, and thus the drive controller 211 maintains the OFF state of the driver 51. Thus, until YES is determined at step S10, the sampling controller 213 executes driving processing of the OFF state by the drive controller 211 for each of the sampling cycles tsp.

When the current detector 60 determines YES at step S10, the sampling controller 213 operates the polarity switching controller 212. The polarity switching controller 212 executes step S11 of determining whether or not the OFF time period measured by the second timer 36 is equal to or greater than a determination time period tmax. The OFF time period measured by the second timer 36 is an elapsed time period from when the driver 51 is caused to be in the OFF state at step S8. In the present embodiment, when YES is determined at step S10, in order to perform determination processing at step S11 at the timing of the sampling cycle tsp, the OFF time period is an integral multiple of the sampling cycle tsp.

When the polarity switching controller 212 determines NO at step S11, the polarity switching controller 212 does not switch the polarity. Then, in order to return to step S5, the drive controller 211 turns the driver 51 ON and continues the driving of the first motor 41.

A relationship between an ON time period Ton, which is a duration in which the driver 51 is continuously in the ON state, an OFF time period Toff, which is a duration in which the driver 51 is continuously in the OFF state, an induced voltage V, a drive voltage E, the drive current I, and a coil resistance R is a relationship expressed in Formula (1). Because the induced voltage V has a correlation with a rotation angle of the rotor 133, an optimal timing for switching the polarity of the driving can be estimated from the ON time period Ton and the OFF time period Toff.

$$V = E*Ton/(Ton+Toff) - R*I \quad (1)$$

Thus, if the OFF time period Toff is less than the determination time period tmax, the polarity switching controller 212 determines NO at step S11, and step S5 is executed in which the drive controller 211 once again turns the driver 51 ON and restarts the supply of the drive current to the coil 130.

On the other hand, when the OFF time period Toff is equal to or greater than the determination time period tmax, step S12 is executed in which the polarity switching controller 212 determines that the rotor 133 has rotated by 180 degrees, and switches the polarity. In other words, when the OFF time period Toff is equal to or greater than the determination time period tmax, the polarity switching controller 212 inverts the state of the L level and the H level of the drive polarity signal PL. Thus, in the case of the first polarity, the polarity switching controller 212 sets the drive polarity signal PL to the L level, and the drive controller 211 controls the driver 51 using the ON/OFF gate signals of the case in which the drive polarity signal PL is L, as illustrated in FIG. 6.

Next, the drive controller 211 executes step S13 of determining whether or not a remaining number of steps is "0". When NO is determined at step S13, since the hand movement of the 360 steps from the start of the driving is not complete, the drive controller 211 returns to step S5 and continues the driving of the first motor 41.

On the other hand, when YES is determined at step S13, the drive controller 211 determines that the hand movement of the 360 steps from the start of the driving is complete and the hour hand 2 and the minute hand 3 have been fast-forwarded by one hour, and ends the drive control of the first motor 41.

Figure 7:
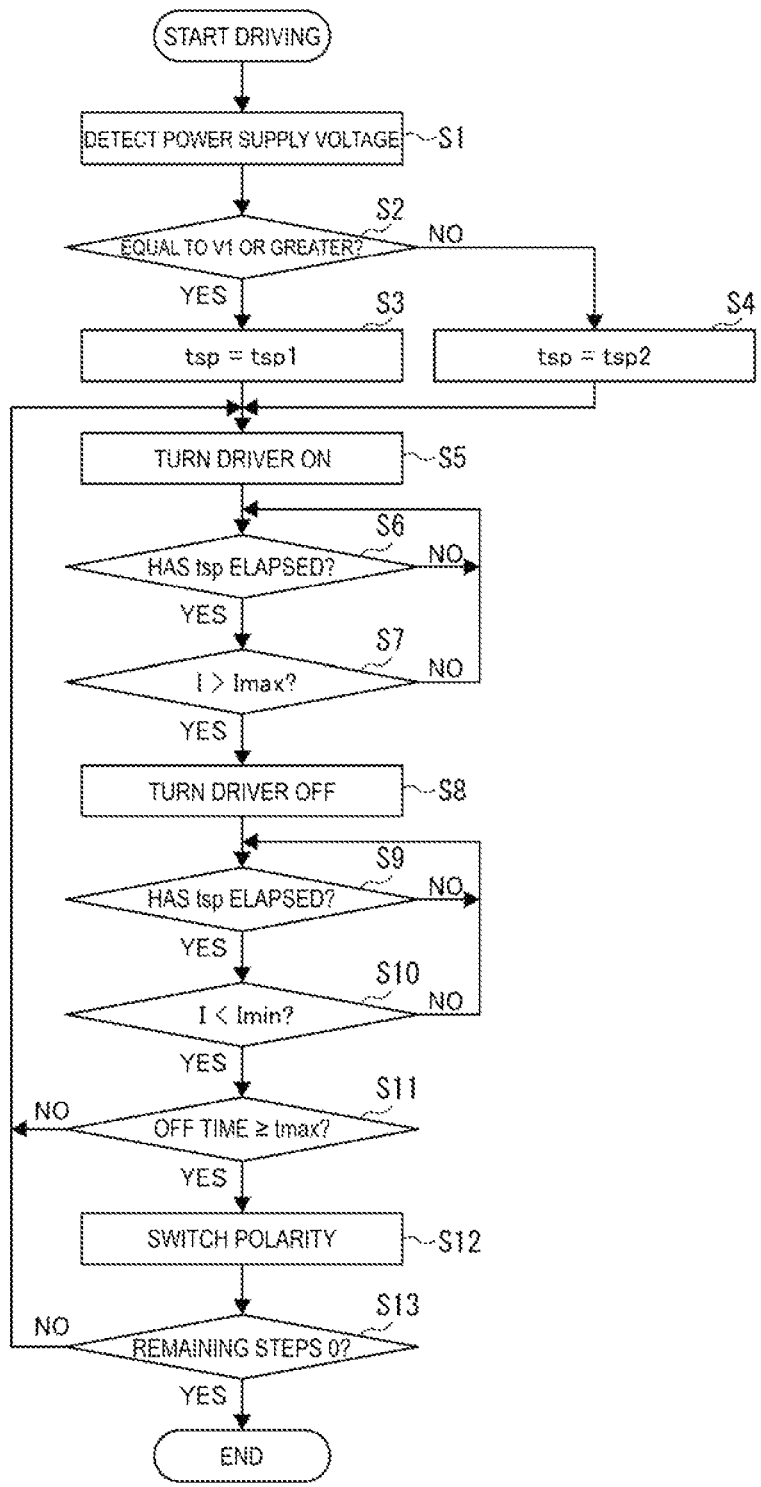
FIG. 7 is a flowchart describing motor control processing according to the first embodiment.

The driving processing illustrated in FIG. 7 is executed each time the switch S1 is pushed and the city hand 5 moves to the display position of the next city having the one hour time difference. In this way, the hour hand 2 and the minute hand 3 are moved by being fast-forwarded by one hour substantially in conjunction with the movement of the city hand 5, and thus, a current time of the city indicated by the city hand 5 can be displayed, and a user can select the time zone while verifying a local time that the user wishes to set.

Effects of First Embodiment

According to the present embodiment, the sampling cycle setting controller 214 sets the sampling cycle tsp to either one of the first cycle tsp1 and the second cycle tsp2, using the power supply voltage detected at the start of the driving. Thus, when the power supply voltage is high, the sampling controller 213 can perform the current detection processing using the shorter first cycle tsp1, and detection errors caused by the delay in the detection timing can thus be suppressed.

Further, when the power supply voltage is low, the sampling controller 213 performs the current detection processing using the second cycle tsp2 that is longer than the first cycle tsp1, and thus the current consumption can be suppressed. Further, when the power supply voltage is low, since the startup of the drive current is also gentle, even when the cycle of the current detection is set to the second cycle tsp2, the delay in the detection timing is unlikely to occur, and detection errors caused by the delay in the detection timing can be suppressed.

Modified Example of First Embodiment

In the first embodiment, the sampling cycle setting controller 214 sets the sampling cycle tsp on the basis of the power supply voltage, but may set the sampling cycle tsp based on the values of the upper limit current value Imax or the lower limit current value Imin. When the upper limit current value Imax and the lower limit current value Imin are increased by reducing the resistance of the coil 130 of the first motor 41, the sampling cycle tsp is preferably shortened because the drive frequency of the first motor 41 increases. Thus, the upper limit current value Imax and the lower limit current value Imin are set in accordance with the characteristics of the first motor 41 to be used, such as in accordance with the resistance value of the coil 130, for example. The upper limit current value Imax and the lower limit current value Imin are stored in the RAM 25, which is a storage device. Thus, the sampling cycle setting controller 214 may read the upper limit current value Imax and the lower limit current value Imin from the RAM 25 and set the sampling cycle tsp in accordance with the values of the upper limit current value Imax and the lower limit current value Imin. In other words, when the value of the upper limit current value Imax or the lower limit current value Imin is equal to or greater than a threshold value, the sampling cycle setting controller 214 sets the shorter first cycle tsp1, and when the value is less than the threshold value, the sampling cycle setting controller 214 may set the longer second cycle tsp2.

Second Embodiment

Figure 9:
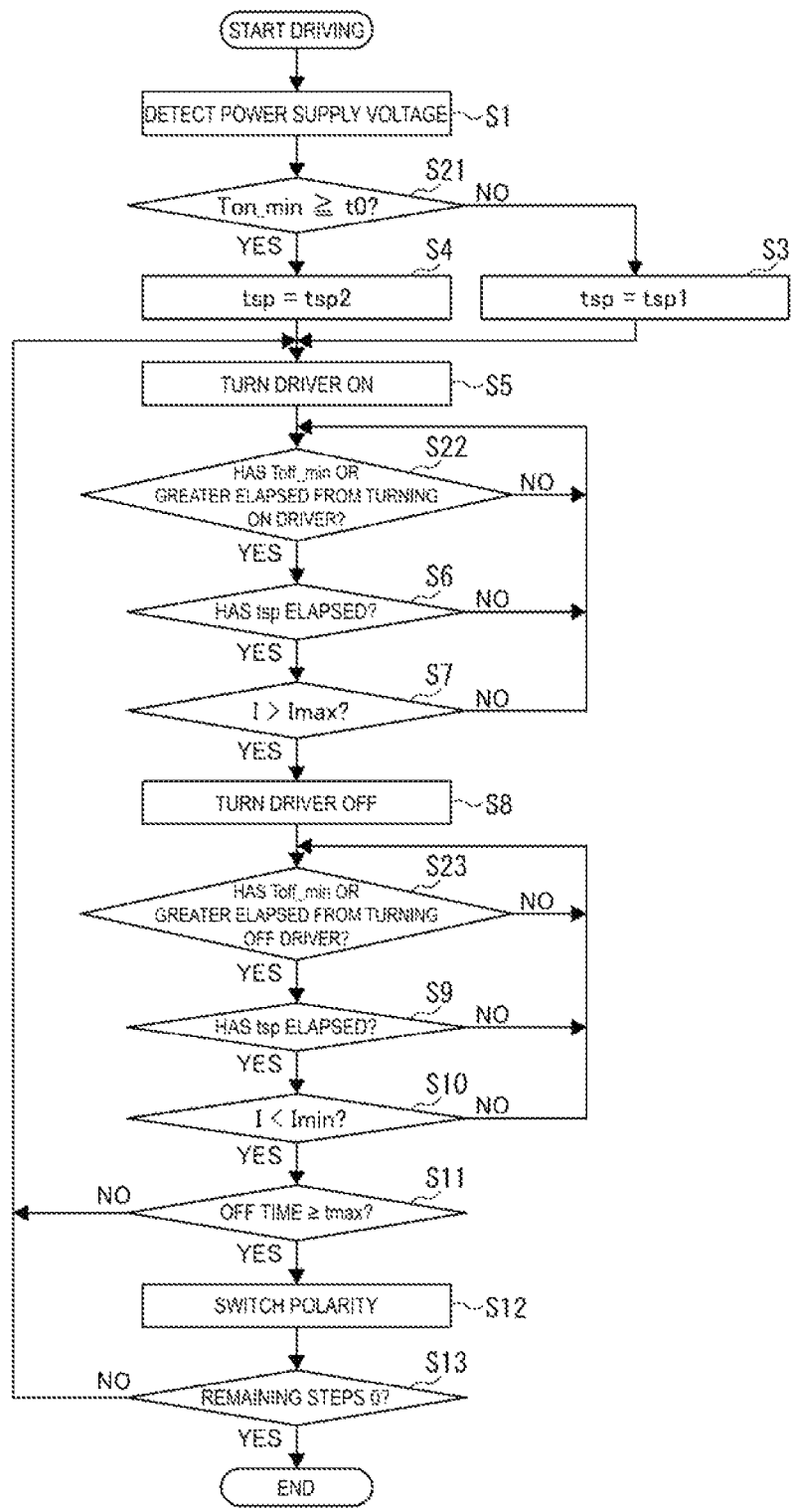
FIG. 9 is a flowchart describing motor control processing according to a second embodiment.

Next, the electronic watch according to a second embodiment will be described. Since the configuration of the electronic watch according to the second embodiment is the same as that of the first embodiment, a description thereof will be omitted. Therefore, a control flow that is different from that of the first embodiment will be described below with reference to a flowchart illustrated in FIG. 9. Note that, in the flowchart illustrated in FIG. 9, the same reference signs are assigned to the processing that is the same as the flowchart illustrated in FIG. 7 of the first embodiment, and a description thereof will be omitted.

The electronic watch of the second embodiment sets a minimum ON time period Ton_min for controlling the driver 51 in the ON state and a minimum OFF time period Toff_min for controlling the driver 51 in the OFF state, and control is performed to maintain the ON state or the OFF state for at least these minimum time periods. As a result, a certain period immediately after switching the polarity is a mask period in which the polarity switching determination is not performed, so as to prevent erroneous detection of the polarity switching determination.

In the electronic watch of the second embodiment also, when the city hand 5 is rotated forward to the position indicating the plus one hour time difference, in order to advance the hour hand 2 and the minute hand 3 by one hour, the drive controller 211 sets the step number of the first motor 41 to 360 and starts driving the first motor 41.

First, the drive controller 211 executes step S1 of detecting the power supply voltage, using the power supply voltage detection circuit 37. The drive controller 211 sets the minimum ON time period Ton_min and the minimum OFF time period Toff_min of the driver 51 in accordance with the detected power supply voltage. Generally, when changes in the drive current flowing through the coil 130 are rapid, such as when the power supply voltage is high, the minimum ON time period Ton_min and the minimum OFF time period Toff_min are preferably set to be short. Thus, set values of the minimum ON time period Ton_min and the minimum OFF time period Toff_min corresponding to the power supply voltage are stored in the RAM 25, and the drive controller 211 sets the minimum ON time period Ton_min and the minimum OFF time period Toff_min in accordance with the detected power supply voltage. Thus, the drive controller 211 is a minimum value setting controller that sets the minimum ON time period Ton_min, which is the minimum value of the ON time period, and the minimum OFF time period Toff_min, which is the minimum value of the OFF time period.

Next, the sampling cycle setting controller 214 executes step S21 of determining whether or not the minimum ON time period Ton_min, which is a sampling cycle setting condition, exceeds a minimum time period threshold value t0. The minimum time period threshold value t0 is 10 μsec, for example.

When NO is determined at step S21, the sampling cycle setting controller 214 executes step S3 in which the sampling cycle tsp is set to the first sampling cycle tsp1, and when YES is determined at step S21, the sampling cycle setting controller 214 executes step S4 in which the sampling cycle tsp is set to the second cycle tsp2 that is longer than the first cycle tsp1. With respect to the first cycle tsp1 and the second cycle tsp2, for example, the first cycle tsp1 is 2 μsec, and the second cycle tsp2 is 4 μsec.

Next, in the same manner as in the first embodiment, the drive controller 211 executes step S5 of causing the driver 51 of the first motor control circuit 31 to be in the ON state, and starting the driving of the first motor 41. The drive controller 211 executes step S22 of determining whether or not the minimum ON time period Ton_min has elapsed from when the driver 51 is turned ON. When NO is determined at step S22, the drive controller 211 continues the determination at step S22, and when YES is determined at step S22, this means that the set mask period has elapsed, and the drive controller 211 advances to the processing at step S6.

Step S6 to step S8 are the same processing as that of the first embodiment, and a description thereof will thus be omitted. Note that in FIG. 9, when NO is determined at step S6 or step S7, the processing is returned to step S22 and the processing is continued, but since YES is already determined at step S22, control may be performed such that the processing is not returned to the determination processing at step S22, and is returned to the determination processing at step S6.

When YES is determined at step S7, the drive controller 211 executes step S8 of causing the driver 51 of the first motor control circuit 31 to be in the OFF state. Next, the drive controller 211 executes step S23 of determining whether or not the minimum OFF time period Toff_min has elapsed from when the driver 51 is turned OFF. When NO is determined at step S23, the drive controller 211 continues the determination at step S23, and when YES is determined, this means that the set mask period has elapsed, and the drive controller 211 advances to the processing at step S9.

Step S9 to step S13 are the same as those of the first embodiment, a description thereof will thus be omitted. Further, in a similar manner to step S6 and step S7, when NO is determined at step S9 and step S10, the processing is returned to step S23, but the processing may be returned to step S9 and continued.

Further, when YES is determined at step S13, the drive controller 211 determines that the hand movement of the 360 steps from the start of the driving is complete and the hour hand 2 and the minute hand 3 have been fast-forwarded by one hour, and ends the drive control of the first motor 41.

Effects of Second Embodiment

According to the second embodiment, the sampling cycle setting controller 214 sets the sampling cycle tsp in accordance with the minimum ON time period Ton_min, which is the mask period for preventing the erroneous determination of the polarity switching. Thus, when the minimum ON time period Ton_min is shorter than the minimum time period threshold t0, that is, when the changes in the drive current are rapid, the sampling cycle tsp can be set to the first cycle tsp1, and when the minimum ON time period Ton_min is equal to or greater than the minimum time period threshold t0, that is, when the changes in the drive current are slow, the sampling cycle tsp can be set to the second cycle tsp2 that is longer than the first cycle tsp1.

Thus, when the changes in the drive current are rapid, the current detection processing can be performed using the short first cycle tsp1, and detection errors caused by the delay in the detection timing can be suppressed. Further, when the changes in the drive current are slow, the current detection processing is performed using the second cycle tsp2 that is longer than the first cycle tsp1. Thus, the power consumption can be suppressed. Further, when the changes in the drive current are slow, the startup of the drive current is also gentle, so even when the cycle of the current detection is set to the second cycle tsp2, the delay in the detection timing is unlikely to occur, and detection errors caused by the delay in the detection timing can be suppressed.

Modified Example of Second Embodiment

In the second embodiment, at step S21, the sampling cycle tsp is set based on the minimum ON time period Ton_min, but the sampling cycle tsp may be set on the basis of the minimum OFF time period Toff_min.

Third Embodiment

Figure 10:
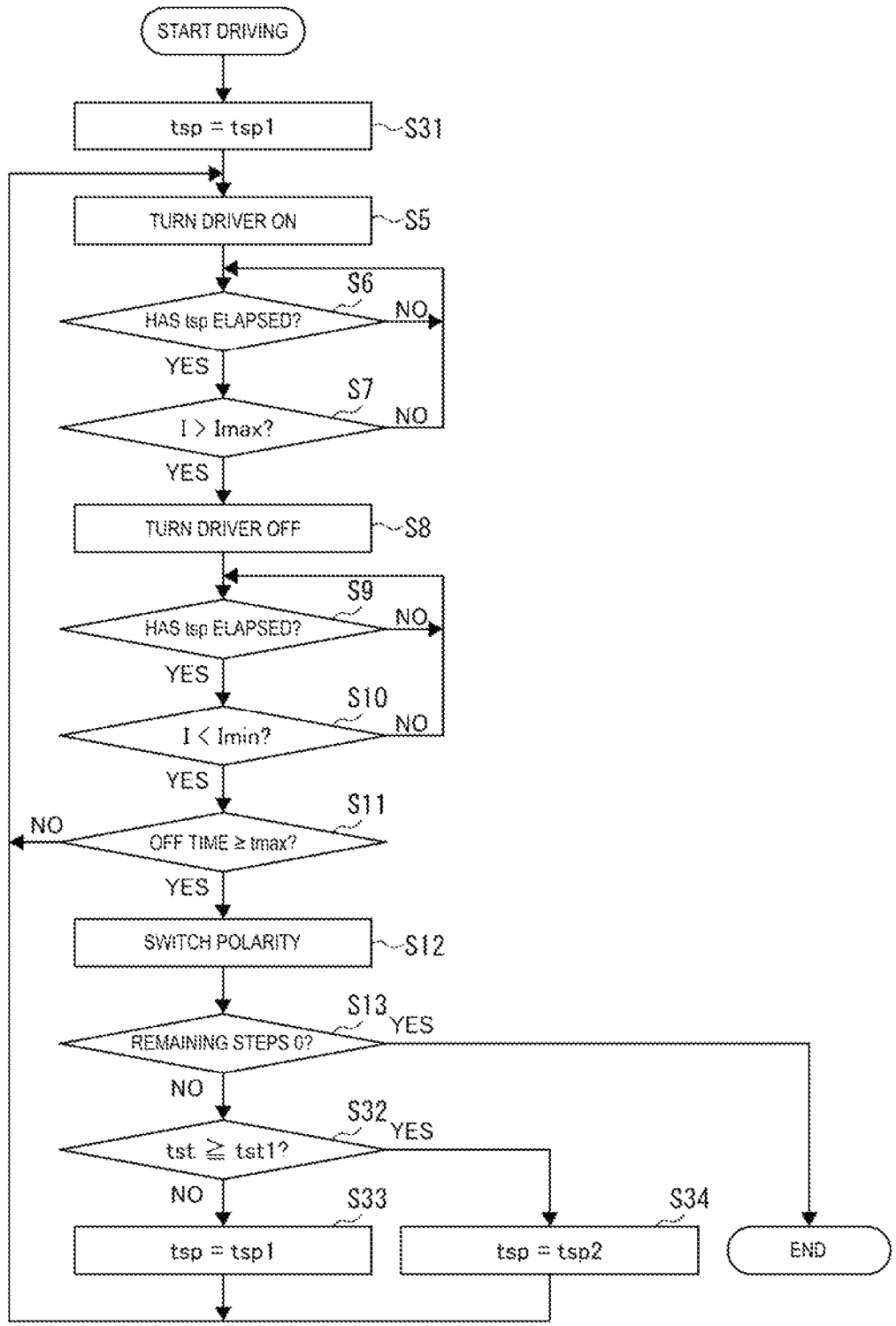
FIG. 10 is a flowchart describing motor control processing according to a third embodiment.

Next, the electronic watch according to a third embodiment will be described. Since the configuration of the electronic watch according to the third embodiment is the same as that of the first embodiment, a description thereof will be omitted. Accordingly, a control flow that is different from that of the first embodiment will be described below on the basis of a flowchart illustrated in FIG. 10 and a timing chart illustrated in FIG. 11. Note that, in the flowchart illustrated in FIG. 10, the same reference signs are assigned to the processing that is the same as the flowchart illustrated in FIG. 7 of the first embodiment, and a description thereof will be omitted.

In the electronic watch according to the third embodiment, at the start of the driving, the sampling cycle tsp is set to the first cycle tsp1, and after that, the sampling cycle tsp of the next step is set using a step period tst, which is a length of the immediately preceding step for each polarity switching, that is, a period from when the driver 51 is turned ON to a timing when a polarity switching condition is met.

In the electronic watch according to the third embodiment, when the city hand 5 is rotated forward to the position indicating the plus one hour time difference, in order to advance the hour hand 2 and the minute hand 3 by one hour, the drive controller 211 sets the step number of the first motor 41 to 360 and starts driving the first motor 41.

First, the sampling cycle setting controller 214 executes step S31 and sets the first cycle tsp1 as an initial value of the sampling cycle tsp.

Next, the polarity switching controller 212 operates the drive controller 211 and the current detector 60 to perform the processing at step S5 to step S12 and performs one step of the driving processing until the polarity of the drive current is switched. Step S5 to step S12 are the same as those of the first embodiment, and a description thereof will thus be omitted.

Next, in the same manner as in the first embodiment, the drive controller 211 executes step S13 of determining whether or not the remaining number of steps is "0". When YES is determined at step S13, the drive controller 211 determines that the hand movement of the 360 steps from the start of the driving is complete and the hour hand 2 and the minute hand 3 have been fast-forwarded by one hour, and ends the drive control of the first motor 41.

On the other hand, when NO is determined at step S13, the sampling cycle setting controller 214 compares the step period tst, which is the sampling cycle setting condition, with a period threshold value tst1. When the sampling cycle setting controller 214 determines that the step period tst is shorter than the time period threshold value tst1 and determines NO at step S32, the sampling cycle setting controller 214 executes step S33 of setting the sampling cycle tsp to the first cycle tsp1. When the sampling cycle setting controller 214 determines that the step period tst is equal to or greater than the time period threshold value tst1 and determines YES at step S32, the sampling cycle setting controller 214 sets the sampling cycle tsp to the second cycle tsp2.

Here, the step period tst may be measured by providing a timer, or may be determined by multiplying the sampling cycle tsp by a number of times the sampling is performed until YES is determined at step S11. Thus, when the number of times the sampling is performed is counted by the sampling controller 213, the sampling controller 213 serves as a step period measuring controller for measuring the step period.

The period threshold value tst1 may be set according to the characteristics of the first motor 41 and the like, and is 2 msec, for example. With respect to the first cycle tsp1 and the second cycle tsp2, for example, the first cycle tsp1 is 2 μsec, and the second cycle tsp2 is 4 μsec.

After the sampling cycle tsp is set at step S33 and step S34, the sampling controller 213 once again executes step S5 to step S12. At this time, the sampling cycle tsp determined at step S6 and step S9 is the first cycle tsp1 or the second cycle tsp2 set at step S33 and step S34.

Figure 11:
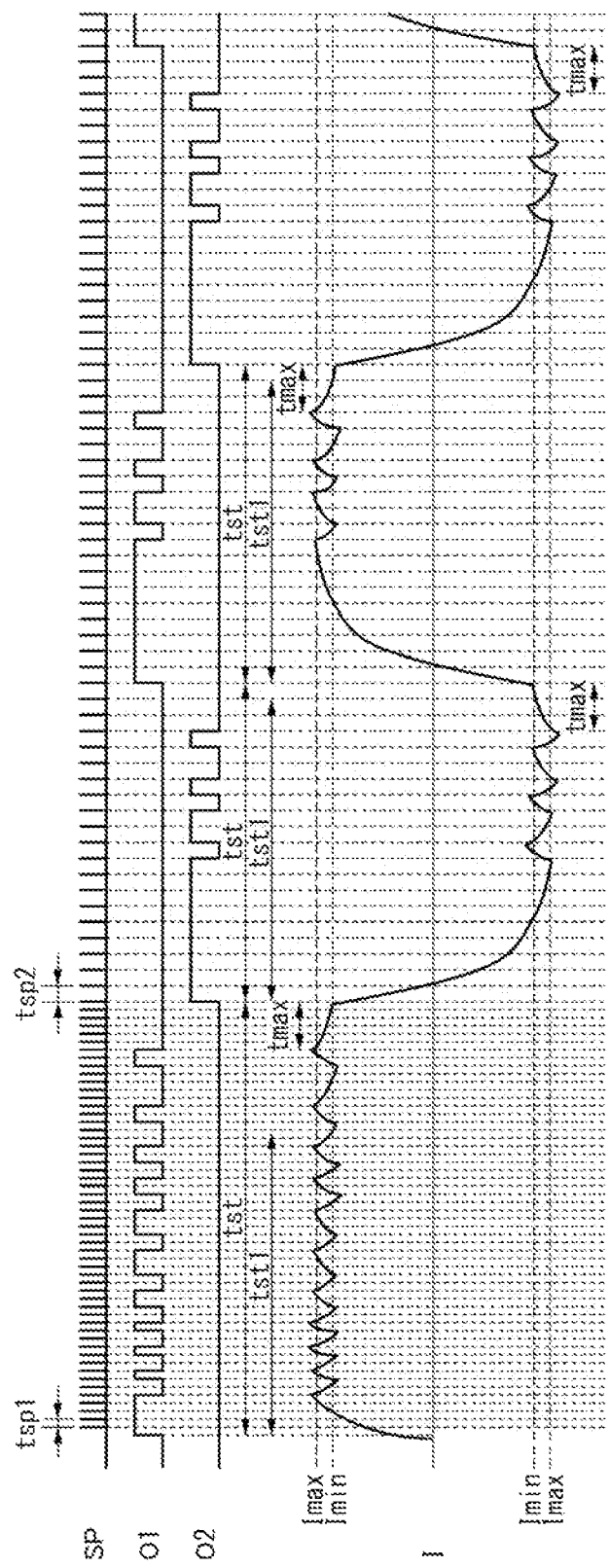
FIG. 11 is a timing chart illustrating operations of the motor control processing according to the third embodiment.

For example, in the timing chart illustrated in FIG. 11, the sampling cycle tsp in a first step is the initial first cycle tsp1. Then, since the step period tst in the first step is equal to or greater than the time period threshold value tst1, the sampling cycle setting controller 214 determines YES at step S32, and switches the sampling cycle tsp to the second cycle tsp2. Therefore, in FIG. 11, from the second step onward, the sampling cycle tsp is the second cycle tsp2. After that, when the step period tst becomes less than the time period threshold value tst1, the sampling cycle tsp is switched to the first cycle tsp1.

Effects of Third Embodiment

According to the third embodiment, the sampling cycle setting controller 214 sets the sampling cycle tsp in conjunction with the step period tst, which is the length of the previous step, and thus the sampling cycle tsp can be appropriately set in accordance with a drive control state of the first motor 41. In other words, when the step period tst is long, the rotation angle of the rotor 133 rotating in a given time period is small, and the current consumption can be reduced by setting the sampling cycle tsp to the second cycle tsp2, namely, lengthening the sampling cycle tsp.

Further, when the rotation angle of the rotor 133 that rotates in the given time period is small, even when the sampling cycle tsp is set to the second cycle tsp2, the delay in the detection timing is unlikely to occur, and detection errors caused by the delay in the detection timing can be suppressed.

On the other hand, when the step period tst is short, the detection errors caused by the delay in the detection timing can be suppressed by setting the sampling cycle tsp to the first cycle tsp1.

Fourth Embodiment

Figure 12:
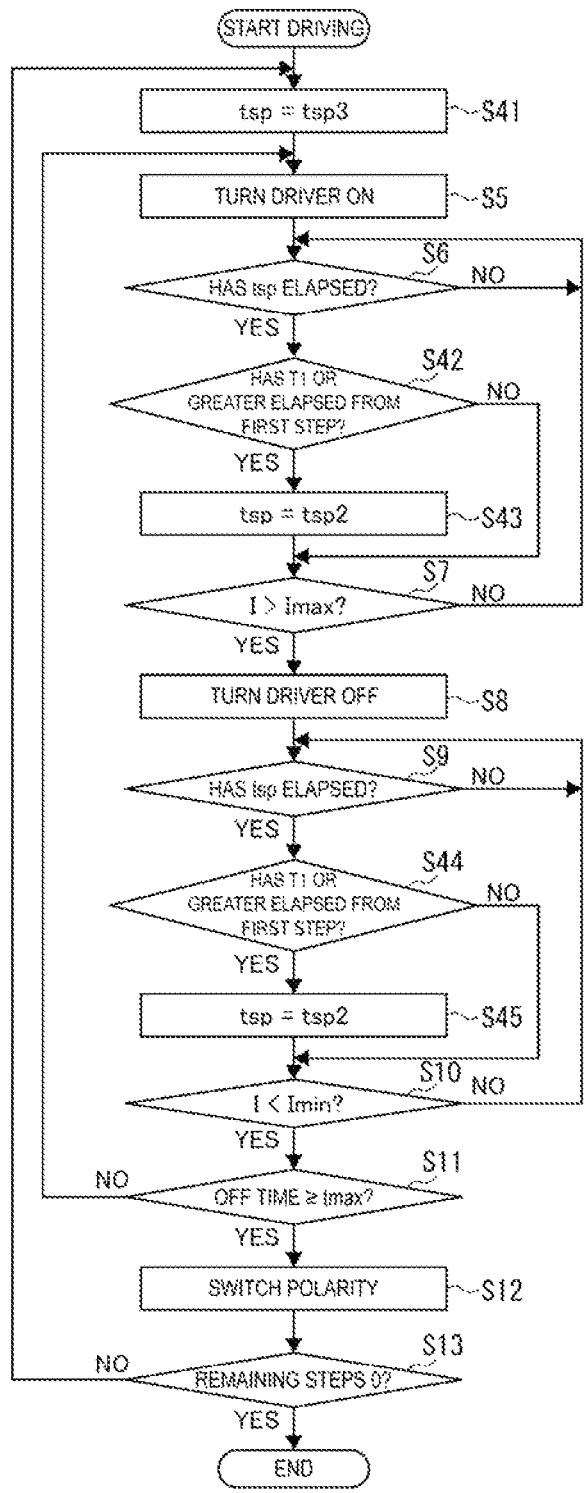
FIG. 12 is a flowchart describing motor control processing according to a fourth embodiment.

Next, the electronic watch according to a fourth embodiment will be described. Since the configuration of the electronic watch according to the fourth embodiment is the same as that of the first embodiment, a description thereof will be omitted. Therefore, a control flow that is different from that of the first embodiment will be described below on the basis of a flowchart illustrated in FIG. 12 and a timing chart illustrated in FIG. 13. Note that, in the flowchart illustrated in FIG. 12, the same reference signs are assigned to the processing that is the same as the flowchart illustrated in FIG. 7 of the first embodiment, and a description thereof will be omitted.

The electronic watch according to the fourth embodiment changes the sampling cycle during the step.

In the electronic watch according to the fourth embodiment also, when the city hand 5 is rotated forward to the position indicating the plus one hour time difference, in order to advance the hour hand 2 and the minute hand 3 by one hour, the drive controller 211 sets the step number of the first motor 41 to 360 and starts driving the first motor 41.

First, the sampling cycle setting controller 214 executes step S41 and sets a third cycle tsp3 as the initial value of the sampling cycle tsp. The third cycle tsp3 is, for example, 8 μsec.

Next, the drive controller 211 executes the processing at step S5 in the same manner as in the first embodiment, and the sampling controller 213 executes step S6. Then, when YES is determined at step S6, the sampling controller 213 measures the elapsed time period from when the driver 51 is turned ON at the start of the step, that is, at step S5, namely, measures the elapsed time period from the switching of the polarity of the drive current, and determines whether or not the elapsed time period is equal to or greater than an elapsed time period threshold value t1.

Here, the elapsed time period may be measured by providing a timer, or, since step S42 is executed each time YES is determined at step S6, the elapsed time period can be determined by multiplying the sampling cycle tsp by the number of times the sampling is performed until YES is determined at step S6. Thus, when the number of times the sampling is performed is counted by the sampling controller 213, the sampling controller 213 serves as a time period measuring controller for measuring the elapsed time period.

The elapsed time period threshold value t1 may be set according to the characteristics of the first motor 41 and the like, and is 1 msec, for example.

When YES is determined at step S42, the sampling controller 213 executes step S43 in which the sampling cycle setting controller 214 is operated, and the sampling cycle setting controller 214 sets the sampling cycle tsp to the second cycle tsp2. The second cycle tsp2 is, for example, 4 μsec.

When NO is determined at step S42, the sampling controller 213 maintains the sampling cycle tsp without change.

The sampling controller 213 executes step S7, which is the current detection processing by the current detector 60, in the same manner as in the first embodiment. The sampling controller 213 repeats step S6 to step S7 for each of the sampling cycles tsp until the drive current I exceeds the upper limit current value Imax at step S7.

When YES is determined at step S7, the drive controller 211 executes step S8 of turning the driver 51 OFF in the same manner as in the first embodiment. After that, the sampling controller 213 executes step S9 to step S10.

At this time, when YES is determined at step S9, the sampling controller 213 executes step S44 of determining whether or not the elapsed time period is equal to or greater than the elapsed time period threshold value t1, in a similar manner to step S42. When NO is determined at step S44, the sampling controller 213 maintains the sampling cycle tsp, and when YES is determined, the sampling controller 213 executes step S45 in which the sampling cycle setting controller 214 is operated and sets the sampling cycle tsp to the second cycle tsp2.

At step S10, the sampling controller 213 operates the current detector 60 to determine whether the drive current I is less than the lower limit current value Imin. When NO is determined at step S10, the sampling controller 213 returns to step S9, and when YES is determined, the sampling controller 213 executes step S11. Since step S11, step S12, and step S13 are the same processing as those of the first embodiment, a description thereof will be omitted.

Then, when NO is determined at step S13, that is, when the driving of the first motor 41 is continued, the processing returns to step S41, the sampling cycle tsp is set to the third cycle tsp3 that is the initial value, and processing is executed to shift to step S5.

In the same manner as in the first embodiment, when the remaining number of steps is "0" and YES is determined at step S13, the drive controller 211 determines that the hand movement of the 360 steps from the start of the driving is complete and the hour hand 2 and the minute hand 3 have been fast-forwarded by one hour, and ends the drive control of the first motor 41.

Figure 13:
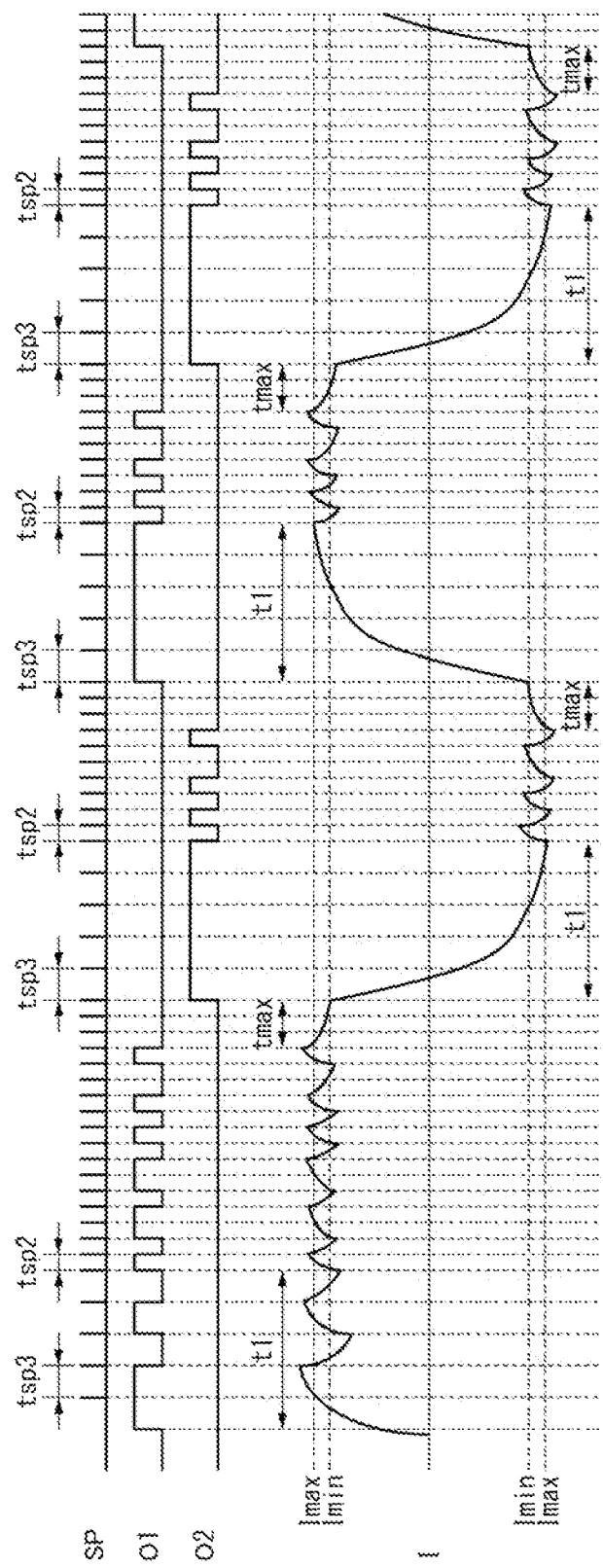
FIG. 13 is a timing chart illustrating operations of the motor control processing according to the fourth embodiment.

By performing the above processing, as illustrated in FIG. 13, when the elapsed time period from switching the polarity of the drive current is less than the elapsed time period threshold value t1, the sampling processing is performed using the third cycle tsp3, and when the elapsed time period is equal to or greater than the elapsed time period threshold value t1, the sampling processing is performed using the second cycle tsp2 that is shorter than the third cycle tsp3.

Effects of Fourth Embodiment

According to the fourth embodiment, since the sampling cycle is changed during the step, both a reduction in the current consumption and an improvement in the detection accuracy of the rotation of the rotor 133 can be achieved. In other words, when the elapsed time period from the switching of the polarity of the drive current is less than the elapsed time period threshold value t1, the sampling processing is performed using the third cycle tsp3, which is the longer cycle, and thus the current consumption can be reduced.

On the other hand, when the elapsed time period is equal to or greater than the elapsed time period threshold value t1, the sampling processing is performed using the second cycle tsp2 that is shorter than the third cycle tsp3. Therefore, the detection processing can be performed at a shorter interval in a latter part of the drive that influences the detection of the rotation of the rotor 133, and detection accuracy of the rotation of the rotor 133 can thus be improved.

Modified Example of Fourth Embodiment

In the fourth embodiment, the sampling cycle tsp is switched between the third cycle tsp3 and the second cycle tsp2, but may be switched between the third cycle tsp3 and the first cycle tsp1, which is, for example, 2 μsec, or may be switched between the second cycle tsp2 and the first cycle tsp1.

Fifth Embodiment

Figure 14:
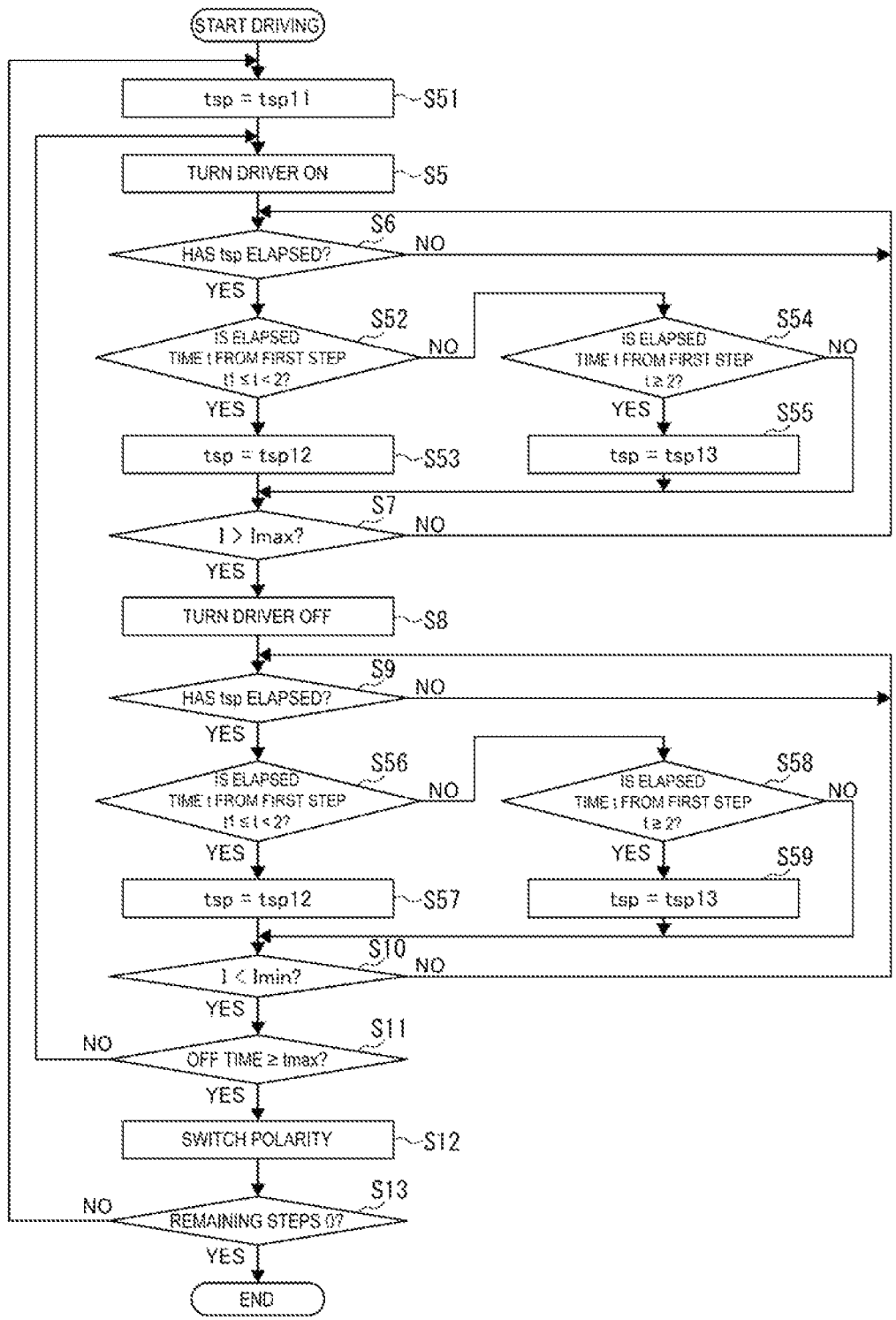
FIG. 14 is a flowchart describing motor control processing according to a fifth embodiment.

Next, the electronic watch according to a fifth embodiment will be described. Since the configuration of the electronic watch of the fifth embodiment is the same as that of the first embodiment, a description thereof will be omitted. Therefore, a control flow that is different from that of the first embodiment will be described below with reference to a flowchart illustrated in FIG. 14. Note that, in the flowchart illustrated in FIG. 14, the same reference signs are assigned to the processing that is the same as the flowchart illustrated in FIG. 12 of the fourth embodiment, and a description thereof will be omitted.

In the fifth embodiment, the sampling cycle tsp is short at the beginning, lengthened in the middle, and finally shortened again, in accordance with the elapsed time period from the switching of the polarity of the drive current, thus switching the sampling cycle tsp over three cycles.

In other words, the sampling cycle setting controller 214 executes step S51 of setting the initial value of the sampling cycle tsp to a first cycle tsp11. Then, after the processing at step S5 and step S6, the sampling controller 213 executes step S52 of determining whether an elapsed time period t from the start of the step is equal to or greater than the first elapsed time period threshold value t1 and less than a second elapsed time period threshold value t2. When YES is determined at step S52, the sampling cycle setting controller 214 sets the sampling cycle tsp to a second cycle tsp12.

Further, when NO is determined at step S52, the sampling controller 213 executes step S54 of determining whether the elapsed time period t from the start of the step is equal to or greater than the second elapsed time period threshold value t2. When YES is determined at step S54, the sampling cycle setting controller 214 executes step S55 of setting the sampling cycle tsp to a third cycle tsp13, and when NO is determined, the sampling cycle setting controller 214 does not change the sampling cycle tsp.

Next, after the processing at step S7 to step S9, the sampling controller 213 executes step S56 of determining whether the elapsed time period t from the start of the step is equal to or greater than the first elapsed time period threshold value t1 and less than the second elapsed time period threshold value t2. When YES is determined at step S56, the sampling cycle setting controller 214 sets the sampling cycle tsp to the second cycle tsp12.

Further, when NO is determined at step S56, the sampling controller 213 executes step S58 of determining whether the elapsed time period t from the start of the step is equal to or greater than the second elapsed time period threshold value t2. When YES is determined at step S58, the sampling cycle setting controller 214 executes step S59 of setting the sampling cycle tsp to the third cycle tsp13, and when NO is determined, the sampling cycle setting controller 214 does not change the sampling cycle tsp.

After that, the processing at step S10 to step S13 is performed, and the above processing is repeated until YES is determined at step S13.

Thus, immediately after switching the polarity of the drive current, the sampling cycle setting controller 214 sets the sampling cycle to the first cycle tsp11, and after that, when the first elapsed time period threshold value t1 has passed, first switching processing is performed to switch to the second cycle tsp12, and next, when the second elapsed time period threshold value t2 has passed, second switching processing is performed to switch to the third cycle tsp13. Note that the first elapsed time period threshold value t1 is 0.5 msec, for example, and the second elapsed time period threshold value t2 is 1.0 msec, for example.

Further, the second cycle tsp12 is set to be longer than the first cycle tsp11 and the third tsp13. The first cycle tsp11 and the third cycle tsp13 may be the same cycle, the first cycle tsp11 may be longer than the third cycle tsp13, or the third cycle tsp13 may be longer than the first cycle tsp11. These cycles may be set according to the characteristics and the like of the first motor 41 that is a target of control. For this reason, specific values of the first cycle tsp11, the second cycle tsp12, and the third cycle tsp13 can be set as appropriate, and the first cycle tsp11 is 2 μsec, the second cycle tsp12 is 4 μsec, and the third cycle tsp13 is 1 sec, for example.

Effects of Fifth Embodiment

According to the fifth embodiment, since the sampling cycle is changed during the step, both the reduction in the current consumption and the improvement in the detection accuracy of the rotation of the rotor 133 can be achieved. In other words, since the sampling cycle is set to the first cycle tsp11 that is shorter than the second cycle tsp12 immediately after switching the polarity of the drive current, a delay in detection at the startup of the drive can be prevented, and overshooting can be suppressed. In this way, an increase in the current consumption due to overshooting can be prevented, and energy saving can be achieved.

Further, when the elapsed time period is equal to or greater than the elapsed time period threshold value t1, the sampling processing is performed using the second cycle tsp12 that is longer than the first cycle tsp11, and thus the current consumption is reduced.

Furthermore, when the elapsed time period is equal to or greater than the second elapsed time period threshold value t2, the sampling processing is performed using the third cycle tsp13, which is shorter than the second cycle tsp12. Therefore, the detection processing can be performed at a shorter interval in the latter part of the drive that influences the detection of the rotor 133, and the rotational detection accuracy of the rotor 133 can thus be improved.

Further, when the first cycle tsp11 and the third cycle tsp13 are set be to the same sampling cycle, there are two types of the sampling cycle value. Thus, a circuit configuration can be simplified compared to a case in which three types of sampling cycle are provided.

On the other hand, when the first cycle tsp11 and the third cycle tsp13 are set to be the different sampling cycles, optimal detection can be performed in accordance with the characteristics of the first motor 41 and the like, and the motor can be more appropriately controlled.

Other Embodiments

Note that the present disclosure is not limited to each of the embodiments described above, and modifications, improvements, and the like within the scope in which the object of the present disclosure can be achieved are included in the present disclosure.

For example, in the first to fourth embodiments, the sampling cycle tsp is switched in the two stages, but may be switched in three or more stages. For example, when the sampling cycle tsp is set in accordance with the power supply voltage, as in the first embodiment, the detected power supply voltage may be compared to two voltage threshold values V1 and V2, and the first cycle tsp1 may be set when the power supply voltage is equal to or greater than the voltage threshold value V1.

Further, when the detected power supply voltage is at an intermediate level, namely, less than the voltage threshold value V1 and equal to or greater than the voltage threshold value V2, the second cycle tsp2 that is longer than the first cycle tsp1 may be set, and when the power supply voltage is at a low level, namely, less than the voltage threshold value V2, the third cycle tsp3 that is longer than the second cycle tsp2 may be set. In the other embodiments also, the sampling cycle tsp may be switched in three or more stages.

Further, when switching the sampling cycle tsp over three periods in accordance with the elapsed time period, as in the fifth embodiment, the configuration is not limited to that in which the middle period is the longest sampling cycle and the initial and last periods are sampling cycles shorter than the middle period. For example, the initial sampling cycle may be the longest cycle and the last sampling cycle may be the shortest period, and the sampling cycle tsp may be switched so as to gradually become shorter.

Furthermore, the control methods of the first to fifth embodiments may be performed in combination. For example, the first embodiment and the fourth embodiment may be combined such that an initial value of the sampling cycle is set to the second cycle tsp2 when the power supply voltage at the start of the drive is equal to or greater than a predetermined voltage threshold value, and set to a third cycle tsp3 that is longer than the second cycle tsp2 when the voltage threshold is less than the voltage threshold value. Then, when the initial value is the second cycle tsp2, the sampling cycle may be switched to the first cycle tsp1 that is shorter than the second cycle tsp2 when the elapsed time period becomes equal to or greater than the elapsed time period threshold value t1, and when the initial value is the third cycle tsp3, the sampling cycle may be switched to the second cycle tsp2 when the elapsed time period becomes equal to or greater than the elapsed time period threshold value t1.

The sampling cycle setting condition may be a parameter measured during the driving of the first motor 41, such as the drive voltage or the step period, or may be a set value set in accordance with the characteristics of the first motor 41, such as the upper limit current value Imax and the lower limit current value Imin based on the resistance value of the coil 130, or may be a combination thereof.

The motor control of the present disclosure is not limited to the motor for the hour hand 2 and the minute hand 3, and may be applied to a motor that drives the seconds hand 4, the city hand 5, and additionally, a mode hand or a hand indicating various types of information, and is particularly suitable for controlling a motor for a hand that needs to be driven in a fast-forward manner using the constant current control.

In each of the above-described embodiments, the city hand 5 indicates the time difference using one hour as a unit, but may be configured to be able to indicate a time difference of 30 minutes or 45 minutes. Specifically, the time zone data is stored in the RAM 25 in association with each of the time zones, the indication position of the city hand 5 indicating the time zone, and a number of hand movement steps of the first motor 41 when moving to the time zone. Each time the switch S1 receives the input as a result of the button 11 being pressed, the city hand 5 is moved to a position indicating the next time zone of the time zone data, the number of steps of the first motor 41 is set to the above-described number of driving steps, and the driving of the first motor 41 is started. For example, when moving to a time zone of plus 30 minutes, the number of steps of the first motor 41 may be set to plus 180, so that the hour hand 2 and the minute hand 3 are fast-forwarded by plus 30 minutes in conjunction with the movement of the city hand 5.

Further, when the time difference indicated by the city hand 5 is changed by one hour as a result of the button 11 being pressed, an amount of movement of the city hand 5 may be fixed, and thus, a selected time difference can be recognized even when the city name or a number indicating the time difference is not marked. For example, the city hand 5 may be configured to move at a rotation angle of ±15 degrees per ±1 hour time difference to indicate a time difference of ±12 hours with respect to UTC. Further, the city hand 5 may also be configured to move at a rotation angle of ±12 degrees per ±1 hour time difference to indicate a time difference of plus 14 hours and minus 12 hours with respect to UTC.

Conclusion

A watch motor control circuit according to the present disclosure includes a driver configured to be controlled to be in an ON state in which a drive current is supplied to a coil of a watch motor, and an OFF state in which the drive current is not supplied, a current detector including a lower limit detector configured to detect that the drive current flowing through the coil is less than a lower limit current value, and an upper limit detector configured to detect that the drive current flowing through the coil is greater than an upper limit current value, a driver controller that, after controlling the driver in the ON state, is configured to control the driver to be in the OFF state when the upper limit detector detects that the drive current is greater than the upper limit current value, and, after controlling the driver in the OFF state, is configured to control the driver to be in the ON state when the lower limit detector detects that the driver current is less than the lower limit current value, a polarity switching controller configured to alternately switch a polarity of the drive current to a first polarity and a second polarity when one of an ON time period that is duration of the ON state of the driver, and an OFF time period that is duration of the OFF state of the driver meets a polarity switching condition, a sampling controller configured to, at a sampling cycle, intermittently cause the current detector and the driver controller to operate, and a sampling cycle setting controller configured to detect a sampling cycle setting condition and change the sampling cycle in at least two stages of a first cycle and a second cycle longer than the first cycle, in accordance with the detected sampling cycle setting condition.

According to the watch motor control circuit according to the present disclosure, the sampling cycle setting controller changes the sampling cycle in the at least two stages of the first cycle and the second cycle, in accordance with the detected sampling cycle setting condition. Then, at the sampling cycle set by the sampling cycle setting controller, the sampling controller intermittently causes the current detector and the driver controller to operate. Thus, when it is necessary to perform current detection processing or the like at a short interval, such as when changes in the drive current are rapid, detection errors due to a delay in a detection timing can be suppressed.

Further, when the changes in the drive current are slow, by setting the sampling cycle to the second cycle, power consumption can be suppressed, the delay in the detection timing is not likely to occur, and thus the detection errors can also be suppressed.

The watch motor control circuit according to the present disclosure preferably includes a time period measuring controller configured to measure an elapsed time period from when the polarity switching controller switches the polarity of the drive current. Preferably, the sampling cycle setting condition is the elapsed time period, and the sampling cycle setting controller compares the elapsed time period with an elapsed time period threshold value. When the elapsed time period is less than the elapsed time period threshold value, the sampling cycle setting controller preferably sets the sampling cycle to the second cycle, and when the elapsed time period is equal to or greater than the elapsed time period threshold value, the sampling cycle setting controller preferably sets the sampling cycle to the first cycle.

According to the watch motor control circuit according to the present disclosure, when the polarity of the drive current is first switched, the sampling cycle is set to the second cycle, and, at a timing equal to or greater than the elapsed time period from when the polarity is switched, the sampling cycle is set to the first cycle. Thus, both a reduction in the current consumption and an improvement in a rotor rotation detection accuracy can be achieved. In other words, when the elapsed time period from the switching of the polarity of the drive current is less than the elapsed time period threshold, the sampling processing is performed using the second cycle, and the current consumption can thus be reduced.

On the other hand, when the elapsed time period is equal to or greater than the elapsed time period threshold, the sampling processing is performed using the first cycle that is shorter than the second cycle. Thus, detection processing can be performed at a shorter interval in a latter part of the drive that influences the detection of the rotation of a rotor, and the detection accuracy of the rotation of the rotor can thus be improved.

The watch motor control circuit according to the present disclosure preferably includes a time period measuring controller configured to measure an elapsed time period from when the polarity switching controller switches the polarity of the drive current. Preferably, the sampling cycle setting condition is the elapsed time period, and the sampling cycle setting controller compares the elapsed time period with a first elapsed time period threshold value and a second elapsed time period threshold value that is a value greater than the first elapsed time period threshold value. When the elapsed time period is less than the first elapsed time period threshold value, the sampling cycle setting controller preferably sets the sampling cycle to a third cycle that is longer than the second cycle. When the elapsed time period is equal to or greater than the first elapsed time period threshold value and less than the second elapsed time period threshold value, the sampling cycle setting controller preferably sets the sampling cycle to the second cycle, and when the elapsed time period is equal to or greater than the second elapsed time period threshold value, the sampling cycle setting controller preferably sets the sampling cycle to the first cycle.

According to the watch motor control circuit according to the present disclosure, when the polarity of the drive current is first switched, the sampling cycle is set to the third cycle, and, when the elapsed time period from when the polarity is switched becomes equal to or greater than the first elapsed time period threshold value, the sampling cycle is set to the second cycle. Furthermore, when the elapsed time period becomes equal to or greater than the second elapsed time period threshold value, the sampling cycle is set to the first cycle, and thus, both the reduction in the current consumption and the improvement in the rotor rotation detection accuracy can be achieved.

The watch motor control circuit according to the present disclosure preferably includes a voltage detection circuit configured to detect a drive voltage for driving the driver. Preferably, the sampling cycle setting condition is the drive voltage, when the drive voltage is equal to or greater than a voltage threshold value, the sampling cycle setting controller sets the sampling cycle to the first cycle, and when the drive voltage is less than the voltage threshold value, the sampling cycle setting controller sets the sampling cycle to the second cycle.

According to the watch motor control circuit according to the present disclosure, the sampling cycle setting controller sets the sampling cycle to either one of the first cycle and the second cycle, using a power supply voltage detected at a start of driving. Thus, when the power supply voltage is high, the sampling controller performs the current detection processing using the short first cycle, and the detection errors caused by the delay in the detection timing can be suppressed.

Further, when the power supply voltage is low, the sampling controller performs the current detection processing using the second cycle that is longer than the first cycle, and thus the power consumption can be suppressed. Further, when the power supply voltage is low, since the startup of the drive current is also gentle, even when the cycle of the current detection is set to the second cycle, the delay in the detection timing is unlikely to occur, and the detection errors caused by the delay in detection timing can be suppressed.

The watch motor control circuit according to the present disclosure preferably includes a minimum value setting controller configured to set one of a minimum value of the ON time period and a minimum value of the OFF time period. Preferably, the sampling cycle setting condition is the one of the minimum value of the ON time period and the minimum value of the OFF time period. When the one of the minimum value of the ON time period and the minimum value of the OFF time period is less than a minimum time period threshold value, the sampling cycle setting controller preferably sets the sampling cycle to the first cycle, and when the one of the minimum value of the ON time period and the minimum value of the OFF time period is equal to or greater than the minimum time period threshold value, the sampling cycle setting controller preferably sets the sampling cycle to the second cycle.

According to the watch motor control circuit according to the present disclosure, the sampling cycle setting controller sets the sampling cycle in accordance with the minimum value of the ON time period or of the OFF time period. Thus, when the minimum value of the ON time period or of the OFF time period is shorter than the minimum time period threshold value, that is, when the changes in the drive current are rapid, the sampling cycle can be set to the first cycle, and detection errors caused by the delay in the detection timing can be suppressed. Further, when the minimum value of the ON time period or of the OFF time period is equal to or greater than the minimum time period threshold value, that is, when the changes in the drive current are slow, the sampling cycle is set to the second cycle and the current detection processing is performed. Thus, the power consumption can be suppressed, and detection errors caused by the delay in the detection timing can also be suppressed.

The watch motor control circuit according to the present disclosure preferably includes a step period measuring controller configured to measure a step period from when the polarity switching controller switches the polarity of the drive current to when the polarity switching controller next switches the polarity. Preferably, the sampling cycle setting condition is the step period, when the step period is less than a period threshold value, the sampling cycle setting controller sets the sampling cycle to the first cycle, and when the step period is equal to or greater than the period threshold value, the sampling cycle setting controller sets the sampling cycle to the second cycle.

According to the watch motor control circuit according to the present disclosure, the sampling cycle setting controller sets the sampling cycle in conjunction with the previous step period, and thus the sampling cycle can be appropriately set in accordance with a drive control state of the watch motor. In other words, when the step period is long, a rotation angle of the rotor rotating at a given time is also small, and the current consumption can be reduced by setting the sampling cycle to the second cycle and lengthening the sampling cycle. Further, when the rotation angle of the rotor that rotates at the given time is small, even when the sampling cycle is set to the second cycle, the delay in the detection timing is unlikely to occur, and detection errors caused by the delay in the detection timing can be suppressed.

On the other hand, when the step period is short, the detection error caused by the delay in the detection timing can be suppressed by setting the sampling cycle to the first cycle.

The watch motor control circuit according to the present disclosure preferably includes a storage device configured to store a set value set using characteristics of the watch motor. Preferably, the sampling cycle setting condition is the set value, and the sampling cycle setting controller sets the sampling cycle to one of the first cycle and the second cycle in accordance with the set value.

According to the watch motor control circuit according to the present disclosure, the sampling cycle can be set in accordance with the characteristics of the watch motor, and therefore, both the reduction in the current consumption and the improvement in the detection accuracy of the rotation of the rotor can be achieved.

In the watch motor control circuit according to the present disclosure, the set value is preferably at least one of the lower limit current value and the upper limit current value.

The lower limit current value and the upper limit current value are set to be high when the resistance value of the coil of the watch motor is small, for example, that is, when the startup of the drive current is steep, and the lower current value and the upper limit current value are set to be low when the resistance value of the coil is high, that is, the startup of the drive current is slow. Therefore, when the lower limit current value and the upper limit current value are the high values, the sampling cycle is set to the first cycle, and when the lower limit current value and the upper limit current value are the low values, the sampling cycle is set to the second cycle. As a result, both the reduction in the current consumption and the improvement in the detection accuracy of the rotation of the rotor can be achieved.

A movement according to an aspect of the present disclosure includes the watch motor control circuit, and a watch motor controlled by the watch motor control circuit.

According to the movement according to the present disclosure, since the watch motor control circuit is provided, when it is necessary to perform the current detection processing or the like at a short interval, such as when the changes in the drive current are rapid, by setting the sampling cycle to the first cycle, detection errors caused by the delay in the detection timing can be suppressed. Further, when the changes in the drive current are slow, by setting the sampling cycle to the second cycle, the power consumption can be suppressed, the delay in the detection timing is also not likely to occur, and the detection errors can also be suppressed.

An electronic watch according to an aspect of the present disclosure includes the watch motor control circuit, and a watch motor controlled by the watch motor control circuit.

According to the electronic watch according to the present disclosure, since the watch motor control circuit is provided, when it is necessary to perform the current detection processing or the like at a short interval, such as when the changes in the drive current are rapid, by setting the sampling cycle to the first cycle, detection errors caused by the delay in the detection timing can be suppressed. Further, when the changes in the drive current are slow, by setting the sampling cycle to the second cycle, power consumption can be suppressed, the delay in the detection timing is not likely to occur, and thus the detection errors can also be suppressed.

A watch motor control method according to an aspect of the present disclosure is a watch motor control method that switches to an ON state and an OFF state in accordance with a current value of a drive current supplied to a coil of a watch motor, and when it is detected that one of an ON time period, which is duration of the ON state, and an OFF time period, which is duration of the OFF state, meets a polarity switching condition, performs constant current control to switch a polarity of the drive current and perform step driving of a rotor. The method includes executing the constant current control at a sampling cycle, and detecting a sampling cycle setting condition, and changing the sampling cycle in at least two stages of a first cycle and a second cycle longer than the first cycle, in accordance with the detected sampling cycle setting condition.

According to the watch motor control method according to the present disclosure, the sampling cycle is changed in the at least two stages of the first cycle and the second cycle, in accordance with the detected sampling cycle setting condition. The constant current control is then executed at the sampling cycle. Thus, when it is necessary to perform current detection processing or the like at a short interval, such as when changes in the drive current are rapid, detection errors due to a delay in a detection timing can be suppressed.

Further, when the changes in the drive current are slow, by setting the sampling cycle to the second cycle, power consumption can be suppressed, the delay in the detection timing is not likely to occur, and thus the detection errors can also be suppressed.

What is claimed is:

1. A watch motor control circuit comprising:
a driver configured to be controlled to be in an ON state in which a drive current is supplied to a coil of a watch motor, and an OFF state in which the drive current is not supplied;
a current detector including a lower limit detector configured to detect that the drive current flowing through the coil is less than a lower limit current value, and an upper limit detector configured to detect that the drive current flowing through the coil is greater than an upper limit current value;
a driver controller that, after controlling the driver to be in the ON state, is configured to control the driver to be in the OFF state when the upper limit detector detects that the drive current is greater than the upper limit current value, and, after controlling the driver to be in the OFF state, is configured to control the driver to be in the ON state when the lower limit detector detects that the driver current is less than the lower limit current value;
a polarity switching controller configured to alternately switch a polarity of the drive current to a first polarity or a second polarity when an ON time period that is a duration of the ON state of the driver, or an OFF time period that is duration of the OFF state of the driver meets a polarity switching condition;
a sampling controller configured to, at a sampling cycle, intermittently cause the current detector and the driver controller to operate; and
a sampling cycle setting controller configured to detect a sampling cycle setting condition and change the sampling cycle in at least two stages of a first cycle and a second cycle longer than the first cycle, in accordance with the detected sampling cycle setting condition.

2. The watch motor control circuit according to claim 1, comprising:
a time period measuring controller configured to measure an elapsed time period from when the polarity switching controller switches the polarity of the drive current, wherein
the sampling cycle setting condition is the elapsed time period,
the sampling cycle setting controller compares the elapsed time period with an elapsed time period threshold value,
when the elapsed time period is less than the elapsed time period threshold value, the sampling cycle setting controller sets the sampling cycle to the second cycle, and
when the elapsed time period is equal to or greater than the elapsed time period threshold value, the sampling cycle setting controller sets the sampling cycle to the first cycle.

3. The watch motor control circuit according to claim 1, comprising:
a time period measuring controller configured to measure an elapsed time period from when the polarity switching controller switches the polarity of the drive current, wherein
the sampling cycle setting condition is the elapsed time period,
the sampling cycle setting controller compares the elapsed time period with a first elapsed time period threshold value and a second elapsed time period threshold value that is a value greater than the first elapsed time period threshold value,
when the elapsed time period is less than the first elapsed time period threshold value, the sampling cycle setting controller sets the sampling cycle to the first cycle,
when the elapsed time period is equal to or greater than the first elapsed time period threshold value and less than the second elapsed time period threshold value, the sampling cycle setting controller sets the sampling cycle to the second cycle that is longer than the first cycle, and
when the elapsed time period is equal to or greater than the second elapsed time period threshold value, the sampling cycle setting controller sets the sampling cycle to a third period that is shorter than the second cycle.

4. The watch motor control circuit according to claim 1, comprising:
a voltage detection circuit configured to detect a drive voltage for driving the driver, wherein
the sampling cycle setting condition is the drive voltage,
when the drive voltage is equal to or greater than a voltage threshold value, the sampling cycle setting controller sets the sampling cycle to the first cycle, and
when the drive voltage is less than the voltage threshold value, the sampling cycle setting controller sets the sampling cycle to the second cycle.

5. The watch motor control circuit according to claim 1, comprising:
a minimum value setting controller configured to set a minimum value of the ON time period or a minimum value of the OFF time period, wherein
the sampling cycle setting condition is the minimum value of the ON time period or the minimum value of the OFF time period,
when the minimum value of the ON time period or the minimum value of the OFF time period is less than a minimum time period threshold value, the sampling cycle setting controller sets the sampling cycle to the first cycle, and
when the minimum value of the ON time period or the minimum value of the OFF time period is equal to or greater than the minimum time period threshold value, the sampling cycle setting controller sets the sampling cycle to the second cycle.

6. The watch motor control circuit according to claim 1, comprising:
a step period measuring controller configured to measure a step period from when the polarity switching controller switches the polarity of the drive current to when the polarity switching controller next switches the polarity, wherein
the sampling cycle setting condition is the step period
when the step period is less than a period threshold value, the sampling cycle setting controller sets the sampling cycle to the first cycle, and
when the step period is equal to or greater than the period threshold value, the sampling cycle setting controller sets the sampling cycle to the second cycle.

7. The watch motor control circuit according to claim 1, comprising:
a storage device configured to store a set value set using characteristics of the watch motor, wherein
the sampling cycle setting condition is the set value, and the sampling cycle setting controller sets the sampling cycle to the first cycle or the second cycle in accordance with the set value.

8. The watch motor control circuit according to claim 7, wherein
the set value is at least one of the lower limit current value or the upper limit current value.

9. An electronic watch comprising:
the watch motor control circuit according to claim 1; and
a watch motor controlled by the watch motor control circuit.

10. A watch motor control method for switching a drive current supplied to a coil of a watch motor to an ON state or an OFF state in accordance with a current value, and, when an ON time period, which is a duration of the ON state, or an OFF time period, which is a duration of the OFF state, is detected to meet a polarity switching condition, performing constant current control of switching a polarity of the drive current to perform step driving of a rotor, the method comprising:
executing the constant current control at a sampling cycle; and
detecting a sampling cycle setting condition, and changing the sampling cycle in at least two stages of a first cycle and a second cycle longer than the first cycle, in accordance with the detected sampling cycle setting condition.

* * * * *